United States Patent
Yin et al.

(10) Patent No.: US 10,499,292 B2
(45) Date of Patent: Dec. 3, 2019

(54) PDN CONNECTION REESTABLISHING METHOD, RESET CENTRAL SERVER, MOBILITY MANAGEMENT NETWORK ELEMENT, AND DATA GATEWAY

(71) Applicant: HUAWEI TECHNOLOGIES CO., LTD, Shenzhen (CN)

(72) Inventors: Yu Yin, Shanghai (CN); Caixia Qi, Shanghai (CN)

(73) Assignee: Huawei Technologies Co., LTD., Shenzhen, P.R. (CN)

( * ) Notice: Subject to any disclaimer, the term of this patent is extended or adjusted under 35 U.S.C. 154(b) by 189 days.

(21) Appl. No.: 15/381,756

(22) Filed: Dec. 16, 2016

(65) Prior Publication Data

US 2017/0099619 A1 Apr. 6, 2017

Related U.S. Application Data

(63) Continuation of application No. PCT/CN2014/081320, filed on Jun. 30, 2014.

(51) Int. Cl.
*H04W 36/00* (2009.01)
*H04W 92/24* (2009.01)
(Continued)

(52) U.S. Cl.
CPC ......... *H04W 36/0072* (2013.01); *H04W 8/10* (2013.01); *H04W 64/006* (2013.01); *H04W 76/19* (2018.02); *H04W 92/24* (2013.01)

(58) Field of Classification Search
None
See application file for complete search history.

(56) References Cited

U.S. PATENT DOCUMENTS

| 8,848,514 B2 | 9/2014 | Kompella et al. |
| 8,848,516 B2 | 9/2014 | Sahin et al. |

(Continued)

FOREIGN PATENT DOCUMENTS

| CN | 102918918 A | 2/2013 |
| CN | 103202064 A | 7/2013 |

(Continued)

OTHER PUBLICATIONS

3GPP TSG Core Network and Terminals, "Restoration procedures" 3GPP TS 23.007 VI2.5.0, vol. Release 12, Jun. 10, 2014 (Jun. 10, 2014).

(Continued)

Primary Examiner — Rebecca E Song
(74) Attorney, Agent, or Firm — Fish & Richardson P.C.

(57) ABSTRACT

Some embodiments of the present disclosure provide a packet data network (PDN) connection reestablishing method, a reset central server, a mobility management network element, and a data gateway. The method includes: receiving, by the reset central server, a first message sent by the data gateway, where the first message includes first identification information; determining, by the reset central server according to the first identification information, an identifier, of the mobility management network element, corresponding to the first identification information; and sending, by the reset central server, a second message to the mobility management network element corresponding to the identifier of the mobility management network element, where the second message includes an identifier of user equipment, so that the mobility management network element reestablishes a packet data network PDN connection of the user equipment according to the second message.

20 Claims, 13 Drawing Sheets

(51) Int. Cl.
*H04W 76/19* (2018.01)
*H04W 8/10* (2009.01)
*H04W 64/00* (2009.01)

(56) References Cited

U.S. PATENT DOCUMENTS

| | | | |
|---|---|---|---|
| 8,908,528 B2 | 12/2014 | Kompella et al. | |
| 8,913,484 B2 | 12/2014 | Kompella et al. | |
| 2009/0176513 A1 | 7/2009 | Bosch et al. | |
| 2009/0316657 A1 | 12/2009 | Singh et al. | |
| 2012/0063300 A1 | 3/2012 | Sahin et al. | |
| 2012/0236708 A1 | 9/2012 | Kompella et al. | |
| 2012/0236823 A1 | 9/2012 | Kompella et al. | |
| 2012/0239966 A1 | 9/2012 | Kompella et al. | |
| 2012/0294155 A1* | 11/2012 | Yin | H04W 24/04 370/242 |
| 2014/0036776 A1* | 2/2014 | Al-Shalash | H04W 40/22 370/328 |
| 2014/0044030 A1* | 2/2014 | Ramachandran | H04W 52/0235 370/311 |
| 2014/0050160 A1* | 2/2014 | Ronneke | H04W 76/028 370/329 |
| 2014/0078890 A1 | 3/2014 | Lu et al. | |
| 2014/0226606 A1* | 8/2014 | Nishigori | H04W 76/32 370/329 |
| 2015/0124585 A1* | 5/2015 | Sahin | H04W 36/12 370/218 |
| 2015/0223133 A1* | 8/2015 | Stojanovski | H04W 52/0251 370/230 |
| 2016/0337859 A1* | 11/2016 | Pantus | H04W 12/08 |

FOREIGN PATENT DOCUMENTS

| | | |
|---|---|---|
| CN | 103535072 A | 1/2014 |
| CN | 103797838 A | 5/2014 |
| EP | 2706810 A2 | 3/2014 |
| RU | 2476022 C2 | 2/2013 |
| RU | 2498535 C2 | 11/2013 |
| WO | 0041414 A1 | 7/2000 |
| WO | 2014059911 A1 | 10/2013 |
| WO | 2014044326 A2 | 3/2014 |
| WO | 2014059911 A1 | 4/2014 |
| WO | 2014079514 A1 | 5/2014 |
| WO | 2014085622 A1 | 6/2014 |

OTHER PUBLICATIONS

3GPP TSG Core Network and Terminals. "Evolved General Packet Radio Service (GPRS) Tunnelling Protocol for Control plane (GTPv2-C)" 3GPP TS 29. 274, vol. Release 12, No. V 12.5,0, Jun. 20, 2014 (Jun. 20, 2014) ISSN: 3GPPEvolved Packet System (EPS).
Huawei. "Path failure on S5 interface" 3GPP TSG CT4 Meeting #65, May 23, 2014 (May 23, 2014) ISSN: C4-140929.
International Search Report issued in international Application No. PCTICN2014/081320 dated Apr. 3, 2015, 7 pages.
Chinese Office Action in Chinese Application No. 201480002426.9, dated Nov. 23, 2017, 12 pages.
3rd Generation Partnership Project; Technical Specification Group Core Network and Terminals; Restoration Procedures (Release 12), 3GPP TS 23.007, V12.5.0. (Jun. 2014), 90 pages.
3rd Generation Partnership Project; Technical Specification Group Core Network and Terminals; 3GPP Evolved Packet System (EPS); Evolved General Packet Radio Service (GPRS) Tunnelling Protocol for Control plan (GTPv2-C); Stage 3 (Release 12); 310 pages.
Huawei—Path Failure on S5 Interface; 3GPP TSG CT4 Meeting #65, C4-140929; Phoenix, US; May 19-23, 2014, 4 pages.
International Search Report issued in International Application No. PCT/CN2014/081320 dated Apr. 3, 2015, 4 pages.
3rd Generation Partnership Project; Technical Specification Group Core Network and Terminals; Study of EPC Nodes Restoration; Release 11, 3GPP TR 23.857, V2.1.0, Dec. 2012, 69 pages.
Extended European Search Report issued in European Application No. 14896991.1, dated May 26, 2017, 11 pages.
Change Request form, 23.007 CR 0206 V. 11.1.0; 3GPP TSG CT WG4 Meeting #56 bis, Paper C4-120695; Taipei, Taiwan, Apr. 16-20, 2012, 4 pages.
Change Request form, 23.007 CR 0293 V. 12.4.0; 3GPP TSG CT4 Meeting #64 bis, Paper C4-140582; Dubrovnik, Coratia; Mar. 31-Apr. 4, 2014, 4 pages.
Patent Office of the Russian Federation Official Action issued in Russian Application No. 2016151164 dated Mar. 28, 2018, 13 pages.

\* cited by examiner

PDN CONNECTION REESTABLISHING METHOD, RESET CENTRAL SERVER, MOBILITY MANAGEMENT NETWORK ELEMENT, AND DATA GATEWAY

CROSS-REFERENCE TO RELATED APPLICATIONS

This application is a continuation of International Application No. PCT/CN2014/081320, filed on Jun. 30, 2014, the disclosure of which is hereby incorporated by reference in its entirety.

TECHNICAL FIELD

The present disclosure relates to the communications field, and in particular, to a PDN (Packet Data Network) connection reestablishing method, a reset central server, a mobility management network element, and a data gateway.

BACKGROUND

In a next generation mobile communications network, user equipment accesses the network by using a local radio access network. A mobility management network element is responsible for functions such as location management, connection management, security authentication, and gateway selection of the mobile user equipment. A serving gateway is a local access gateway of the user equipment and is responsible for connection management and data forwarding that are related to an access technology. A data gateway is a gateway through which the user equipment accesses an external data network.

Because after a network device (a serving gateway and/or a data gateway) is reset, user information on the reset serving gateway and information about a PDN connection on the reset data gateway are lost. Therefore, after a downlink data packet of a user arrives at the reset network device, the reset network device discards the data packet because a specific user and information about a PDN connection cannot be found. When the downlink data packet corresponds to a relatively important service such as a called voice call, reset of the network device may cause a failure of the called voice call, and therefore, satisfaction of the user on a network is reduced, and user experience is affected.

SUMMARY

Embodiments of the present disclosure provide a PDN connection reestablishing method, a reset central server, a mobility management network element, and a data gateway, which can reestablish a PDN connection affected by reset of a network device, improving user experience.

According to a first aspect, a reset central server is provided, including: a first receiving unit, configured to receive a first message sent by a data gateway, where the first message includes first identification information; a determining unit, configured to determine, according to the first identification information, an identifier, of a mobility management network element, corresponding to the first identification information; and a sending unit, configured to send a second message to the mobility management network element corresponding to the identifier of the mobility management network element, where the second message includes an identifier of user equipment, so that the mobility management network element reestablishes a packet data network PDN connection of the user equipment according to the second message.

With reference to the first aspect, in a first possible implementation manner, the first identification information includes an Internet Protocol IP address of the user equipment or the identifier of the user equipment, and the reset central server further includes: a second receiving unit, configured to receive a first registration message that is sent by the data gateway and used to register information about the user equipment, where the first registration message includes the Internet Protocol IP address of the user equipment and the identifier of the user equipment; a third receiving unit, configured to receive a second registration message that is sent by the mobility management network element and used to register information about the user equipment, where the second registration message includes the identifier of the mobility management network element and the identifier of the user equipment; and an association unit, configured to associate the Internet Protocol IP address of the user equipment and the identifier of the user equipment with the identifier of the mobility management network element according to the identifier of the user equipment.

With reference to the first possible implementation manner, in a second possible implementation manner, the first registration message further includes an access point name APN corresponding to the PDN connection, and the second message further includes the APN, so that the mobility management network element reestablishes the PDN connection according to the identifier of the user equipment and the APN.

With reference to the first or the second possible implementation manner, in a third possible implementation manner, when the data gateway is reset, the first identification information includes the IP address of the user equipment, and the determining unit determines, according to the IP address of the user equipment, the identifier of the mobility management network element and the identifier of the user equipment that are corresponding to the IP address of the user equipment.

With reference to the first or the second possible implementation manner, in a fourth possible implementation manner, when a serving gateway is reset, the first identification information includes the identifier of the user equipment.

With reference to any one of the first aspect, or the first to the fourth possible implementation manners, in a fifth possible implementation manner, the identifier of the mobility management network element includes at least one of an IP address of the mobility management network element, a globally unique identifier of the mobility management network element, or a fully qualified domain name FQDN of the mobility management network element; and the identifier of the user equipment includes at least one of an international mobile subscriber identity IMSI of the user equipment, a mobile station international ISDN number MSISDN, or an international mobile equipment identity IMEI.

According to a second aspect, a mobility management network element is provided, including: a receiving unit, configured to receive a second message sent by a reset central server, where the second message includes an identifier of user equipment, the second message is used to trigger the mobility management network element to reestablish the PDN connection, and the second message is sent after the reset central server receives a first message sent by a data gateway, where the first message includes first identification information of the user equipment; and a reestablishing unit, configured to reestablish the PDN connection according to the second message.

With reference to the second aspect, in a first possible implementation manner, the first identification information includes an Internet Protocol IP address of the user equipment or the identifier of the user equipment, and the mobility management network element further includes: a sending unit, configured to send, to the reset central server, a second registration message used to register information about the user equipment, where the second registration message includes an identifier of the mobility management network element and the identifier of the user equipment.

With reference to the first possible implementation manner, in a second possible implementation manner, the sending unit sends, to the reset central server according to a first selection policy, the second registration message used to register the information about the user equipment, where the first selection policy includes registering information about user equipment that establishes a PDN connection of an IP multimedia subsystem IMS access point name APN, or registering information about high-level user equipment VIP.

With reference to the first or the second possible implementation manner, in a third possible implementation manner, the reestablishing unit determines, according to a second selection policy, a PDN connection that needs to be reestablished, where the second selection policy includes recovering the PDN connection of the IMS APN, or recovering a PDN connection of a VIP user.

With reference to any one of the first to the third possible implementation manners, in a fourth possible implementation manner, the second registration message further includes an access point name APN corresponding to the PDN connection, and the correspondence includes a correspondence among the Internet Protocol IP address of the user equipment and/or the identifier of the user equipment, the APN, and the identifier of the mobility management network element; the second message further includes the APN; and the reestablishing unit reestablishes the PDN connection according to the identifier of the user equipment and the APN.

With reference to any one of the second aspect, or the first to the fourth possible implementation manners, in a fifth possible implementation manner, the second message further includes a reset indication, and the reset indication is used to represent that the serving gateway is reset; and the reestablishing unit reselects a serving gateway, and sends a session setup request message to the reselected serving gateway, where the session setup message includes information about a PDN connection, of the user equipment, that needs to be recovered, so that the PDN connection is reestablished on the reselected serving gateway.

With reference to any one of the second aspect, or the first to the fourth possible implementation manners, in a sixth possible implementation manner, the data gateway and a serving gateway are jointly deployed, and some PDN connections of all PDN connections of the user equipment are established on a reset data gateway; and if the data gateway is reset, the reestablishing unit reselects a serving gateway, and sends a session setup request message to the reselected serving gateway, where the session setup request message carries information about a PDN connection established by the user equipment on another data gateway that is not reset, so that the reselected serving gateway establishes a PDN connection to the another data gateway that is not reset, where the reselected serving gateway is a reset and restarted serving gateway or another serving gateway.

With reference to any one of the second aspect, or the first to the fourth possible implementation manners, in a seventh possible implementation manner, the data gateway and a serving gateway are jointly deployed, and some PDN connections of all PDN connections of the user equipment are established on a reset data gateway; and if the data gateway is reset, the reestablishing unit sends a deactivation request message to the user equipment, and deletes the PDN connections on the reset data gateway, so that the user equipment reestablishes the PDN connections.

With reference to any one of the second aspect, or the first to the fourth possible implementation manners, in an eighth possible implementation manner, the mobility management network element is an MME, the data gateway and a serving gateway are jointly deployed, or the data gateway and a serving gateway are separately deployed, and all PDN connections of the user equipment are established on a reset data gateway; and if the data gateway is reset, the reestablishing unit sends a detach request message to the user equipment, where the detach request message carries a cause value of a re-attach request, so that the user equipment deletes all PDN connections according to the detach request message and reinitiates an attach procedure.

With reference to any one of the second aspect, or the first to the fourth possible implementation manners, in a ninth possible implementation manner, the mobility management network element is an SGSN, the data gateway and a serving gateway are jointly deployed, or the data gateway and a serving gateway are separately deployed, and all PDN connections of the user equipment are established on a reset data gateway; and if the data gateway is reset, the reestablishing unit sends a PDP deactivation message to the user equipment, where the PDP deactivation message carries a cause value of a reactivation request, so that the user equipment deletes all PDP connections according to the PDP deactivation message and reinitiates an activate PDP request.

With reference to any one of the second aspect, or the first to the fourth possible implementation manners, in a tenth possible implementation manner, the data gateway and a serving gateway are separately deployed, and some PDN connections of all PDN connections of the user equipment are established on a reset data gateway; and if the data gateway is reset, the reestablishing unit sends a deactivation request message to the user equipment, and deletes the PDN connections on the reset data gateway, so that the user equipment reestablishes the PDN connections.

With reference to any one of the fifth to the tenth possible implementation manners of the second aspect, in an eleventh possible implementation manner, the mobility management network element further includes: a determining unit, configured to determine, according to identification information of a data gateway and identification information of a serving gateway, whether the data gateway and the serving gateway are jointly deployed, where the identification information of the data gateway and the identification information of the serving gateway include an IP address of the data gateway and an IP address of the serving gateway, and/or a fully qualified domain name of the data gateway and a fully qualified domain name of the serving gateway.

With reference to any one of the second aspect, or the first to the eleventh possible implementation manners, in a twelfth possible implementation manner, the identifier of the user equipment includes at least one of an international mobile subscriber identity IMSI of the user equipment, a mobile station international ISDN number MSISDN, or an international mobile equipment identity IMEI; and the identifier of the mobility management network element includes at least one of an IP address of the mobility management network element, a globally unique identifier of the mobility management network element, or a fully qualified domain name FQDN of the mobility management network element.

According to a third aspect, a data gateway is provided, including: a receiving unit, configured to receive a downlink data packet; and a first sending unit, configured to send a first message to a reset central server, where the first message includes first identification information of user equipment, so that the reset central server reestablishes the PDN connection according to the first message.

With reference to the third aspect, in a first possible implementation manner, the data gateway further includes: a second sending unit, configured to send, to the reset central server, a first registration message used to register information about the user equipment, where the first registration message includes an IP address of the user equipment and an identifier of the user equipment.

With reference to the first possible implementation manner, in a second possible implementation manner, the second sending unit sends, to the reset central server according to a selection policy, the first registration message used to register the information about the user equipment, where the selection policy includes registering information about a PDN connection, of an IMS APN, of the user equipment, or registering information about a PDN connection of VIP.

With reference to the second possible implementation manner, in a third possible implementation manner, the first registration message further includes an access point name APN corresponding to the PDN connection, and the first message further includes the APN.

With reference to any one of the third aspect, or the first to the third possible implementation manners, in a fourth possible implementation manner, the data gateway further includes: a first determining unit, configured to determine that the data gateway is reset; and determine that the downlink data packet is from a trusted APN, and determine the IP address of the user equipment in a header of the downlink data packet, where the first message includes the IP address of the user equipment.

With reference to any one of the third aspect, or the first to the third possible implementation manners, in a fifth possible implementation manner, the data gateway further includes: a second determining unit, configured to determine that a serving gateway is reset; and determine, by querying a context of the PDN connection of the user equipment corresponding to the downlink data packet, the identifier of the user equipment corresponding to the downlink data packet, where the first message includes the identifier of the user equipment.

With reference to the fifth possible implementation manner, in a sixth possible implementation manner, the first message further includes a reset indication, and the reset indication represents that the serving gateway is reset, or represents an error indication message sent by the serving gateway to the data gateway, where the error indication message represents that the serving gateway is reset.

With reference to any one of the third aspect, or the first to the sixth possible implementation manners, in a seventh possible implementation manner, the identifier of the user equipment includes at least one of an international mobile subscriber identity IMSI of the user equipment, a mobile station international ISDN number MSISDN, or an international mobile equipment identity IMEI.

According to a fourth aspect, a packet data network PDN connection reestablishing method is provided, including: receiving, by a reset central server, a first message sent by a data gateway, where the first message includes first identification information; determining, by the reset central server according to the first identification information, an identifier, of a mobility management network element, corresponding to the first identification information; and sending, by the reset central server, a second message to the mobility management network element corresponding to the identifier of the mobility management network element, where the second message includes an identifier of user equipment, so that the mobility management network element reestablishes the PDN connection according to the second message.

With reference to the fourth aspect, in a first possible implementation manner, the first identification information includes an Internet Protocol IP address of the user equipment or the identifier of the user equipment, and the method further includes: receiving, by the reset central server, a first registration message that is sent by the data gateway and used to register information about the user equipment, where the first registration message includes the Internet Protocol IP address of the user equipment and the identifier of the user equipment; receiving, by the reset central server, a second registration message that is sent by the mobility management network element and used to register information about the user equipment, where the second registration message includes the identifier of the mobility management network element and the identifier of the user equipment; and associating, by the reset central server, the Internet Protocol IP address of the user equipment and the identifier of the user equipment with the identifier of the mobility management network element according to the identifier of the user equipment.

With reference to the first possible implementation manner, in a second possible implementation manner, the first registration message further includes an access point name APN corresponding to the PDN connection, and the second message further includes the APN, so that the mobility management network element reestablishes the PDN connection according to the identifier of the user equipment and the APN.

With reference to the first or the second possible implementation manner, in a third possible implementation manner, when the data gateway is reset, the first identification information includes the IP address of the user equipment; and the determining, by the reset central server according to the first identification information, an identifier, of a mobility management network element, corresponding to the first identification information includes: determining, by the reset central server according to the IP address of the user equipment, the identifier of the mobility management network element and the identifier of the user equipment that are corresponding to the IP address of the user equipment.

With reference to the first or the second possible implementation manner, in a fourth possible implementation manner, when a serving gateway is reset, the first identification information includes the identifier of the user equipment.

With reference to any one of the fourth aspect, or the first to the fourth possible implementation manners, in a fifth possible implementation manner, the identifier of the mobility management network element includes at least one of an IP address of the mobility management network element, a globally unique identifier of the mobility management network element, or a fully qualified domain name FQDN of the mobility management network element; and the identifier of the user equipment includes at least one of an international mobile subscriber identity IMSI of the user equipment, a mobile station international ISDN number MSISDN, or an international mobile equipment identity IMEI.

According to a fifth aspect, a PDN connection reestablishing method is provided, including: receiving, by a mobility management network element, a second message sent by a reset central server, where the second message includes an identifier of user equipment, the second message is used to trigger the mobility management network element to reestablish the PDN connection, and the second message is sent after the reset central server receives a first message sent by a data gateway, where the first message includes the first identification information; and reestablishing, by the mobility management network element, the PDN connection according to the second message.

With reference to the fifth aspect, in a first possible implementation manner, the first identification information includes an Internet Protocol IP address of the user equipment or the identifier of the user equipment, and the method further includes: sending, by the mobility management network element to the reset central server, a second registration message used to register information about the user equipment, where the second registration message includes an identifier of the mobility management network element and the identifier of the user equipment.

With reference to the first possible implementation manner, in a second possible implementation manner, the sending, by the mobility management network element to the reset central server, a second registration message used to register information about the user equipment includes: sending, by the mobility management network element to the reset central server according to a first selection policy, the second registration message used to register the information about the user equipment, where the first selection policy includes registering information about user equipment that establishes a PDN connection of an IP multimedia subsystem IMS access point name APN, or registering information about high-level user equipment VIP.

With reference to the first or the second possible implementation manner, in a third possible implementation manner, the reestablishing, by the mobility management network element, the PDN connection according to the second message includes: determining, by the mobility management network element according to a second selection policy, a PDN connection that needs to be reestablished, where the second selection policy includes recovering the PDN connection of the IMS APN, or recovering a PDN connection of a VIP user.

With reference to any one of the first to the third possible implementation manners, in a fourth possible implementation manner, the second message further includes the APN, and the reestablishing, by the mobility management network element, the PDN connection according to the second message includes: reestablishing, by the mobility management network element, the PDN connection according to the identifier of the user equipment and the APN.

With reference to any one of the fifth aspect, or the first to the fourth possible implementation manners, in a fifth possible implementation manner, the second message further includes a reset indication, and the reset indication is used to represent that the serving gateway is reset; and the reestablishing, by the mobility management network element, the PDN connection according to the second message includes: reselecting, by the mobility management network element, a serving gateway, and sending a session setup request message to the reselected serving gateway, where the session setup message includes information about a PDN connection, of the user equipment, that needs to be recovered, so that the PDN connection is reestablished on the reselected serving gateway.

With reference to any one of the fifth aspect, or the first to the fourth possible implementation manners, in a sixth possible implementation manner, the data gateway and a serving gateway are jointly deployed, and some PDN connections of all PDN connections of the user equipment are established on a reset data gateway; and the reestablishing, by the mobility management network element according to the second message, the PDN connection corresponding to the user equipment includes: if the data gateway is reset, reselecting, by the mobility management network element, a serving gateway, and sending a session setup request message to the reselected serving gateway, where the session setup request message carries information about a PDN connection established by the user equipment on another data gateway that is not reset, so that the reselected serving gateway establishes a PDN connection to the another data gateway that is not reset, where the reselected serving gateway is a reset and restarted serving gateway or another serving gateway.

With reference to any one of the fifth aspect, or the first to the fourth possible implementation manners, in a seventh possible implementation manner, the data gateway and a serving gateway are jointly deployed, some PDN connections of all PDN connections of the user equipment are established on a reset data gateway, and the reestablishing, by the mobility management network element according to the second message, the PDN connection corresponding to the user equipment includes: if the data gateway is reset, sending, by the mobility management network element, a deactivation request message to the user equipment, and deleting the PDN connections on the reset data gateway, so that the user equipment reestablishes the PDN connections.

With reference to any one of the fifth aspect, or the first to the fourth possible implementation manners, in an eighth possible implementation manner, the mobility management network element is an MME, the data gateway and a serving gateway are jointly deployed, or the data gateway and a serving gateway are separately deployed, all PDN connections of the user equipment are established on a reset data gateway, and the reestablishing, by the mobility management network element according to the second message, the PDN connection corresponding to the user equipment includes: if the data gateway is reset, sending, by the mobility management network element, a detach request message to the user equipment, where the detach request message carries a cause value of a re-attach request, so that the user equipment deletes all PDN connections according to the detach request message and reinitiates an attach procedure.

With reference to any one of the fifth aspect, or the first to the fourth possible implementation manners, in a ninth possible implementation manner, the mobility management network element is an SGSN, the data gateway and a serving gateway are jointly deployed, or the data gateway and a serving gateway are separately deployed, all PDN connections of the user equipment are established on a reset data gateway, and the reestablishing, by the mobility management network element according to the second message, the PDN connection corresponding to the user equipment includes: if the data gateway is reset, sending, by the mobility management network element, a PDP deactivation message to the user equipment, where the PDP deactivation message carries a cause value of a reactivation request, so that the user equipment deletes all PDP connections according to the PDP deactivation message and reinitiates an activate PDP request.

With reference to any one of the fifth aspect, or the first to the fourth possible implementation manners, in a tenth possible implementation manner, the data gateway and a serving gateway are separately deployed, some PDN connections of all PDN connections of the user equipment are established on a reset data gateway, and the reestablishing, by the mobility management network element according to the second message, the PDN connection corresponding to the user equipment includes: if the data gateway is reset, sending, by the mobility management network element, a deactivation request message to the user equipment, and deleting the PDN connections on the reset data gateway, so that the user equipment reestablishes the PDN connections.

With reference to any one of the fifth to the tenth possible implementation manners of the fifth aspect, in an eleventh possible implementation manner, the method further includes: determining, by the mobility management network element according to identification information of a data gateway and identification information of a serving gateway, whether the data gateway and the serving gateway are jointly deployed, where the identification information of the data gateway and the identification information of the serving gateway include an IP address of the data gateway and an IP address of the serving gateway, and/or a fully qualified domain name of the data gateway and a fully qualified domain name of the serving gateway.

With reference to any one of the fifth aspect, or the first to the eleventh possible implementation manners, in a twelfth possible implementation manner, the identifier of the user equipment includes at least one of an international mobile subscriber identity IMSI of the user equipment, a mobile station international ISDN number MSISDN, or an international mobile equipment identity IMEI; and the identifier of the mobility management network element includes at least one of an IP address of the mobility management network element, a globally unique identifier of the mobility management network element, or a fully qualified domain name FQDN of the mobility management network element.

According to a sixth aspect, a PDN connection reestablishing method is provided, including: receiving, by a data gateway, a downlink data packet; and sending, by the data gateway, a first message to a reset central server, where the first message includes first identification information, so that the reset central server reestablishes the PDN connection according to the first message.

With reference to the sixth aspect, in a first possible implementation manner, the method further includes: sending, by the data gateway to the reset central server, a first registration message used to register information about user equipment, where the first registration message includes an IP address of the user equipment and an identifier of the user equipment.

With reference to the first possible implementation manner, in a second possible implementation manner, the sending, by the data gateway to the reset central server, a first registration message used to register information about user equipment includes: sending, by the data gateway to the reset central server according to a selection policy, the first registration message used to register the information about the user equipment, where the selection policy includes registering information about a PDN connection, of an IMS APN, of user equipment, or registering information about a PDN connection of VIP.

With reference to the second possible implementation manner, in a third possible implementation manner, the first registration message further includes an access point name APN corresponding to the PDN connection, and the first message further includes the APN.

With reference to any one of the sixth aspect, or the first to the third possible implementation manners, in a fourth possible implementation manner, the method further includes: determining, by the data gateway, that the data gateway is reset; and determining, by the data gateway, that the downlink data packet is from a trusted APN, and determining the IP address of the user equipment in a header of the downlink data packet, where the first message includes the IP address of the user equipment.

With reference to any one of the sixth aspect, or the first to the third possible implementation manners, in a fifth possible implementation manner, the method further includes: determining, by the data gateway, that a serving gateway is reset; and determining, by the data gateway by querying a context of the PDN connection of the user equipment corresponding to the downlink data packet, the identifier of the user equipment corresponding to the downlink data packet, where the first message includes the identifier of the user equipment.

With reference to the fifth possible implementation manner, in a sixth possible implementation manner, the first message further includes a reset indication, and the reset indication represents that the serving gateway is reset, or represents an error indication message sent by the serving gateway to the data gateway, where the error indication message represents that the serving gateway is reset.

With reference to any one of the sixth aspect, or the first to the sixth possible implementation manners, in a seventh possible implementation manner, the identifier of the user equipment includes at least one of an international mobile subscriber identity IMSI of the user equipment, a mobile station international ISDN number MSISDN, or an international mobile equipment identity IMEI.

Based on the foregoing technical solutions, a reset central server may receive a first message sent by a data gateway; search, according to first identification information included in the first message, stored information for an identifier, of a mobility management network element, corresponding to the first identification information; and send a second message to the mobility management network element corresponding to the identifier of the mobility management network element, where the second message includes an identifier of user equipment, so that the mobility management network element can reestablish an affected packet data network PDN connection in a timely manner according to the second message, improving user experience.

BRIEF DESCRIPTION OF DRAWINGS

To describe the technical solutions in some embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions in the embodiments of the present disclosure may be applied to various communications systems, such as: a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, a Universal Mobile Telecommunications System (UMTS), and a Worldwide Interoperability for Microwave Access (WiMAX) communications system.

Figure 1:
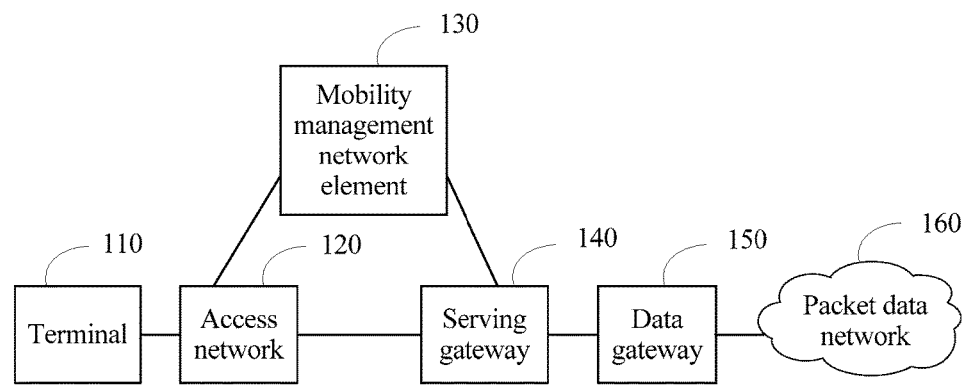
FIG. 1 is a schematic diagram of a scenario of a communications network that may be applied to an embodiment of the present disclosure.

FIG. 1 is a schematic diagram of a scenario of a communications network that may be applied to an embodiment of the present disclosure. A logical architecture of a mobile communications network shown in FIG. 1 includes: user equipment 110, an access network 120, a mobility management network element 130, a serving gateway 140, a data gateway 150, and a packet data network 160. The user equipment 110 is connected to the access network 120 by using a local wireless network or wired network. The mobility management network element 130 is responsible for functions such as location management, connection management, security authentication, and gateway selection of the user equipment 110. The serving gateway 140 is a local access gateway of the user equipment 110 and is responsible for connection management and data forwarding that are related to an access technology. The data gateway 150 is a gateway through which the user equipment accesses the external packet data network 160.

An actual network corresponding to the foregoing logical architecture diagram may be an Evolved Packet System (EPS) network. The access network may be a Universal Terrestrial Radio Access Network (UTRAN), a GSM EDGE Radio Access Network (GERAN), or an Evolved Universal Terrestrial Radio Access Network (E-UTRAN). The mobility management network element may be a mobility management entity (MME) or a serving GPRS support node (SGSN). The serving gateway may be a serving gateway (S-GW). The data gateway may be a packet data network gateway (PDN-GW).

It should be understood that the data gateway and the serving gateway in the embodiments of the present disclosure may be jointly deployed, or may be separately deployed, which is not limited in the embodiments of the present disclosure. The embodiments of the present disclosure are mainly for a scenario in which a PDN connection is reestablished after the data gateway is reset and/or the serving gateway is reset.

Figure 2:
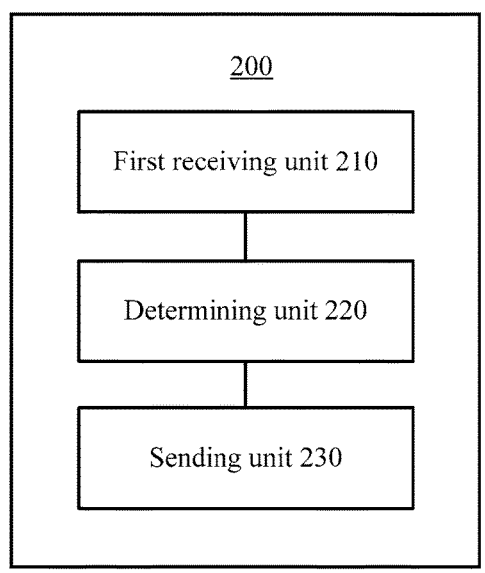
FIG. 2 is a schematic block diagram of a reset central server according to an embodiment of the present disclosure.

Specifically, FIG. 2 is a schematic block diagram of a reset central server according to an embodiment of the present disclosure. A reset central server 200 shown in FIG. 2 includes a first receiving unit 210, a determining unit 220, and a sending unit 230.

The first receiving unit 210 is configured to receive a first message sent by a data gateway, where the first message includes first identification information of user equipment.

The determining unit 220 is configured to determine, according to the first identification information, an identifier, of a mobility management network element, corresponding to the first identification information.

The sending unit 230 is configured to send a second message to the mobility management network element corresponding to the identifier of the mobility management network element, where the second message includes an identifier of the user equipment, so that the mobility management network element reestablishes a packet data network PDN connection of the user equipment according to the second message.

Therefore, in this embodiment of the present disclosure, the first message sent by the data gateway may be received; stored information is searched, according to the first identification information of the user equipment included in the first message, for the identifier of the mobility management network element and the identifier of the user equipment that are corresponding to the first identification information; and the second message is sent to the mobility management network element corresponding to the identifier of the mobility management network element, where the second message includes the identifier of the user equipment, so that the mobility management network element reestablishes the packet data network PDN connection according to the second message. Because an affected PDN connection can be reestablished in a timely manner, user experience is improved.

Specifically, after registration of information about the user equipment is completed, after a network device (the data gateway and/or a serving gateway) is reset, and after the data gateway receives a downlink data packet, a data center reset central server receives the first message sent by the data gateway, where the first message includes the first identification information of the user equipment. Then the data central server searches, according to the first identification information, the information stored when the information about the user equipment is registered for the identifier of the mobility management network element and the identifier of the user equipment that are corresponding to the first identification information, and sends the second message to the mobility management network element corresponding to the identifier of the mobility management network element, where the second message includes the identifier of the user equipment, so that the mobility management network element reestablishes the packet data network PDN connection according to the second message, and recovery of a PDN connection affected by reset of the network device (the data gateway and/or the serving gateway) is implemented.

Therefore, in this embodiment of the present disclosure, a reset central server may receive a first message sent by a data gateway; search, according to first identification information of user equipment included in the first message, stored information for an identifier of a mobility management network element and an identifier of the user equipment that are corresponding to the first identification information; and send a second message to the mobility management network element corresponding to the identifier of the mobility management network element, where the second message includes the identifier of the user equipment, so that the mobility management network element reestablishes a packet data network PDN connection according to the second message. Because an affected PDN connection can be reestablished in a timely manner, user experience is improved.

It should be understood that, the reset central server in this embodiment of the present disclosure may be an independently deployed logical entity, or may be jointly deployed with another network element in a network, for example, the reset central server may be a device such as a Home Subscriber Server (HSS) or a Policy and Charging Rules Function (PCRF). Information about the reset central server may be configured on the data gateway, or may be configured and delivered to the data gateway by using another network element such as an HSS, a PCRF, or a network management operation and maintenance O&M (Operation and Maintenance) center. The data gateway sends a message to a corresponding reset central server according to the information.

Information about a user/PDN connection affected due to node reset may be reestablished by using the following conventional solutions, so that a downlink data packet can be sent to the user equipment, and methods are as follows.

When the serving gateway is reset, reestablishing methods are as follows: Method 1: After the mobility management network element learns that the serving gateway is reset, for affected user equipment, the mobility management network element reselects a serving gateway, initiates a serving gateway handover procedure, and reestablishes a context of the user equipment on the selected serving gateway. After learning that the serving gateway is reset, the data gateway reserves, for a period of time, a context of a PDN connection affected by reset of the serving gateway, and waits for the serving gateway selected by the mobility management network element to update downlink tunnel information to the data gateway. Method 2: After the data gateway learns that the serving gateway is reset, if a downlink data packet of user equipment affected by reset of the serving gateway is received, the data gateway selects a serving gateway, and sends a downlink data packet notification message to the serving gateway. The serving gateway forwards the downlink data packet notification message to the mobility management network element, and the mobility management network element reselects a serving gateway, executes a serving gateway handover procedure, and reestablishes a context of the user on the selected serving gateway. However, in the foregoing two methods, when the serving gateway is reset, for the reestablishing method 1, recovery is triggered after the mobility management network element detects that the serving gateway is reset. A reset detection mechanism may be not timely, and consequently downlink data of some user equipments cannot arrive. For the method 2, the data gateway needs to send the downlink data packet notification message to trigger recovery. However, in an actual network, the serving gateway and the data gateway are jointly deployed in most cases, and when the serving gateway is reset, the data gateway is also reset. Therefore, the data gateway cannot implement the recovery mechanism in the method 2.

When the data gateway is reset, a reestablishing method is as follows: After the serving gateway learns that the data gateway is reset, the serving gateway sends a data gateway reset notification message to the mobility management network element, where the message includes an Internet Protocol (IP address for short) of the data gateway and an IP address of the serving gateway. After receiving the message, the mobility management network element scans related PDN connections according to the IP address of the data gateway and the IP address of the serving gateway, and initiates a PDN connection deletion/user detach procedure to trigger user equipment to reestablish a PDN connection. However, when the data gateway is reset, for the recovery method, recovery is triggered after the serving gateway detects that the data gateway is reset. A problem that a detection mechanism is not timely also exists, and the method further depends on time of scanning, after the serving gateway learns that the data gateway is reset, an internal affected PDN connection. Before the serving gateway learns that the data gateway is reset, a downlink data packet of user equipment may be discarded. Similarly, if the serving gateway and the data gateway are jointly deployed, when the data gateway is reset, the serving gateway is also reset, and the serving gateway cannot implement the recovery method used when the data gateway is reset.

In the foregoing reestablishing methods used when a serving gateway is reset and a data gateway is reset, a user needs to wait for a long time, and a downlink data packet cannot arrive at user equipment in a timely manner, affecting user experience. For example, in a voice call, user equipment cannot perform a called service for a long time, and service experience of the user equipment is affected. Therefore, a calling party has low satisfaction on the network and the service because of failures in attempting to contact a called party multiple times. However, in this embodiment of the present disclosure, when a data gateway is reset and/or a serving gateway is reset, a reset central server may receive a first message sent by the data gateway, where the first message includes first identification information of user equipment; search, according to the first identification information, stored information for an identifier of a mobility management network element and an identifier of the user equipment that are corresponding to the first identification information; and send a second message to the mobility management network element corresponding to the identifier of the mobility management network element, where the second message includes the identifier of the user equipment, so that the mobility management network element is triggered to reestablish a packet data network PDN connection according to the second message. An affected PDN connection can be reestablished in a timely manner, so that a downlink data packet can arrive at the user equipment in a timely manner, waiting time of a user is reduced, and user experience is improved.

Figure 3:
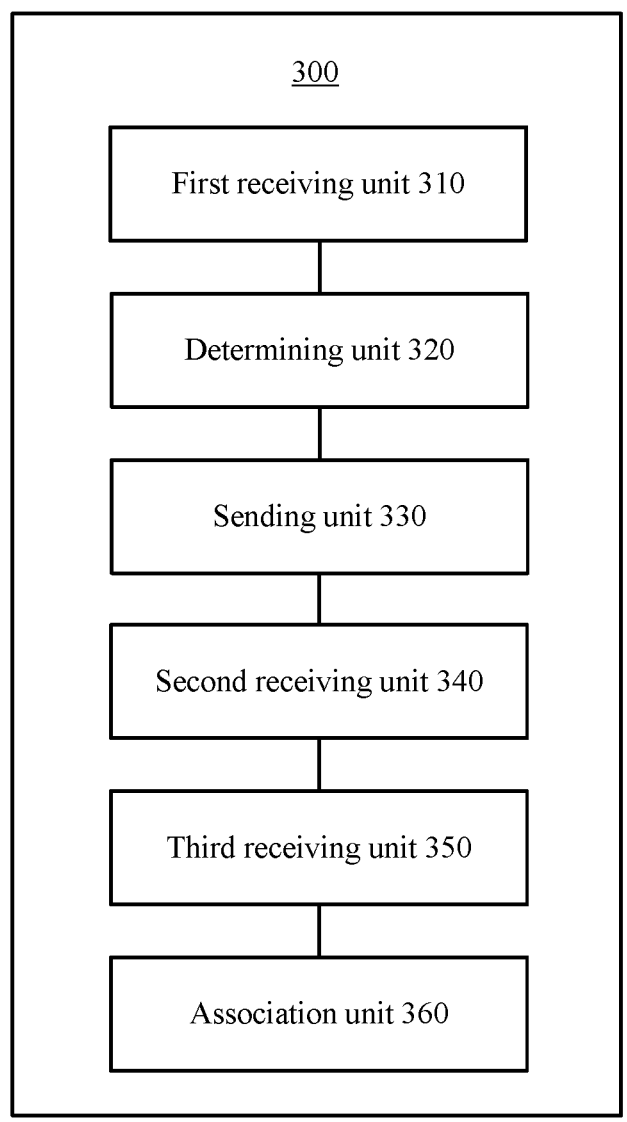
FIG. 3 is a schematic block diagram of a reset central server according to another embodiment of the present disclosure.

Optionally, as another embodiment, as shown in FIG. 3, a reset central server in this embodiment of the present disclosure includes a first receiving unit 310, a determining unit 320, a sending unit 330, a second receiving unit 340, a third receiving unit 350, and an association unit 360.

Specifically, the first receiving unit 310, the determining unit 320, and the sending unit 330 can respectively implement functions corresponding to the first receiving unit 210, the determining unit 220, and the sending unit 230 in FIG. 2. To avoid repetition, details are not described again. The second receiving unit 340 is configured to receive a first registration message that is sent by a data gateway and used to register information about user equipment, where the first registration message includes an Internet Protocol IP address of the user equipment and an identifier of the user equipment. The third receiving unit 350 is configured to receive a second registration message that is sent by a mobility management network element and used to register information about the user equipment, where the second registration message includes an identifier of the mobility management network element and the identifier of the user equipment. The association unit 360 is configured to associate the Internet Protocol IP address of the user equipment and the identifier of the user equipment with the identifier of the mobility management network element according to the identifier of the user equipment.

In other words, in this embodiment of the present disclosure, a registration process of the user equipment needs to be completed before the data gateway is reset and/or a serving gateway is reset, and information about a PDN is registered at the reset central server. Specifically, the reset central server may receive the first registration message that is sent by the data gateway and used to register the information about the user equipment, where the first registration message includes the Internet Protocol IP address of the user equipment and the identifier of the user equipment; the reset central server receives the second registration message that is sent by the mobility management network element and used to register the information about the user equipment, where the second registration message includes the identifier of the mobility management network element and the identifier of the user equipment; and then the reset central server associates the data gateway with the mobility management network element, and enables information about nodes related to the PDN connection to correspond to each other, according to the identifier of the user equipment.

Optionally, as another embodiment, the first registration message further includes an access point name APN corresponding to the PDN connection, and a second message further includes the APN, so that the mobility management network element reestablishes the PDN connection according to the identifier of the user equipment and the APN.

Optionally, as another embodiment, when the data gateway is reset or the data gateway and the serving gateway are simultaneously reset, first identification information includes the IP address of the user equipment, and the determining unit 220 determines, according to the IP address of the user equipment, the identifier of the mobility management network element and the identifier of the user equipment that are corresponding to the IP address of the user equipment.

Optionally, as another embodiment, when the serving gateway is reset, first identification information includes the identifier of the user equipment.

Alternatively, when the serving gateway is reset, the first identification information includes the identifier of the user equipment.

Optionally, as another embodiment, the identifier of the mobility management network element includes at least one of an IP address of the mobility management network element, a globally unique identifier of the mobility management network element, or a fully qualified domain name FQDN of the mobility management network element; and the identifier of the user equipment includes at least one of an international mobile subscriber identity IMSI of the user equipment, a mobile station international ISDN number MSISDN, or an international mobile equipment identity IMEI.

Figure 4:
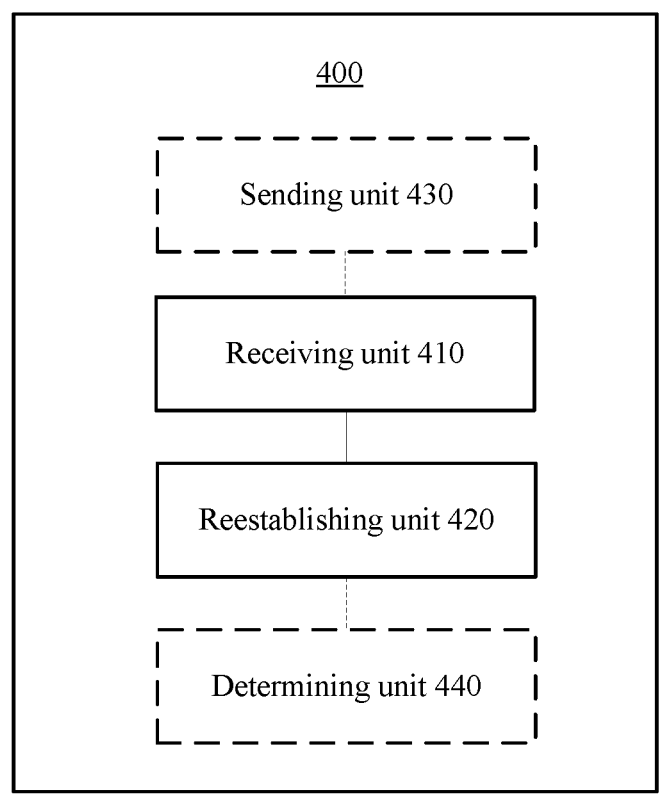
FIG. 4 is a schematic block diagram of a mobility management network element according to an embodiment of the present disclosure.

FIG. 4 is a schematic block diagram of a mobility management network element according to an embodiment of the present disclosure. A mobility management network element 400 shown in FIG. 4 includes a receiving unit 410 and a reestablishing unit 420.

Specifically, the receiving unit 410 is configured to receive a second message sent by a reset central server, where the second message includes an identifier of user equipment, the second message is used to trigger the mobility management network element to reestablish a PDN connection of the user equipment, and the second message is sent after the reset central server receives a first message sent by a data gateway, where the first message includes first identification information of the user equipment. The reestablishing unit 420 is configured to reestablish the PDN connection of the user equipment according to the second message.

Therefore, in this embodiment of the present disclosure, a second message sent by a reset central server may be received, where the second message includes an identifier of user equipment, and the second message is used to trigger a mobility management network element to reestablish a PDN connection; and the mobility management network element reestablishes the PDN connection of the user equipment according to the second message. Because an affected PDN connection can be reestablished in a timely manner, user experience is improved.

Optionally, as another embodiment, the first identification information includes an Internet Protocol IP address of the user equipment or the identifier of the user equipment, and the mobility management network element further includes a sending unit 430.

Specifically, the sending unit 430 is configured to send, to the reset central server, a second registration message used to register information about the user equipment, where the second registration message includes an identifier of the mobility management network element and the identifier of the user equipment.

In other words, in this embodiment of the present disclosure, a registration process of the user equipment needs to be completed before the data gateway is reset and/or a serving gateway is reset, and information about a PDN is registered at the reset central server. Specifically, that the mobility management registers the information about the user equipment includes: sending, by the mobility management network element to the reset central server, the second registration message used to register the information about the user equipment, where the second registration message includes the identifier of the mobility management network element and the identifier of the user equipment.

Optionally, as another embodiment, the sending unit 430 sends, to the reset central server according to a first selection policy, the second registration message used to register the information about the user equipment, where the first selection policy includes registering information about user equipment that establishes a PDN connection of an IP multimedia subsystem IMS access point name APN, or registering information about high-level user equipment VIP.

It should be understood that the identifier of the user equipment may include at least one of an international mobile subscriber identity IMSI of the user equipment, a mobile station international ISDN number MSISDN, or an international mobile equipment identity IMEI. The identifier of the mobility management network element may include at least one of an IP address of the mobility management network element, a globally unique identifier of the mobility management network element, or a fully qualified domain name FQDN of the mobility management network element.

Optionally, as another embodiment, the reestablishing unit 420 determines, according to a second selection policy, a PDN connection that needs to be reestablished, where the second selection policy includes recovering the PDN connection of the IMS APN, or recovering a PDN connection of a VIP user.

Optionally, as another embodiment, the second registration message further includes an access point name APN corresponding to the PDN connection of the user equipment, and a correspondence includes a correspondence among the Internet Protocol IP address of the user equipment and/or the identifier of the user equipment, the APN, and the identifier of the mobility management network element; the second message further includes the APN; and the reestablishing unit 420 reestablishes the PDN connection according to the identifier of the user equipment and the APN.

Optionally, as another embodiment, the second message further includes a reset indication, and the reset indication is used to represent that the serving gateway is reset. The reestablishing unit 420 reselects a serving gateway, and sends a session setup request message to the reselected serving gateway, where the session setup message includes information about a PDN connection, of the user equipment, that needs to be recovered, so that the PDN connection is reestablished on the reselected serving gateway.

The reselected serving gateway is a reset and restarted serving gateway or another serving gateway. Further, in an actual application, the mobility management network element may reestablish the PDN connection according to a status of the user equipment.

Specifically, when reestablishing the PDN connection, if the user equipment is in a state being connected to the mobility management network element, the mobility management network element first releases a signaling connection to the user equipment, and changes the user equipment into an idle state; and then the mobility management network element reselects a serving gateway, and sends the session setup request message to the reselected serving gateway, where the session setup message includes the information about the PDN connection, of the user equipment, that needs to be recovered, so that the PDN connection is reestablished on the reselected serving gateway.

Alternatively, if the user equipment is initiating a service request, a tracking area update procedure in which the mobility management network element remains unchanged, or a routing area update procedure in which the mobility management network element remains unchanged, the mobility management network element first reselects a serving gateway, and sends a session setup request message to the reselected serving gateway, where the session setup message includes information about a PDN connection, of the user equipment, that needs to be recovered, so that the PDN connection is reestablished on the reselected serving gateway; and then the mobility management network element executes a subsequently initiated service request, tracking area update procedure in which the mobility management network element remains unchanged, or routing area update procedure in which the mobility management network element remains unchanged.

Alternatively, if the user equipment is initiating a tracking area update procedure in which the mobility management network element is changed or a routing area update procedure in which the mobility management network element is changed, the mobility management network element notifies a target-side mobility management network element that a procedure of reselecting a serving gateway needs to be executed; and the target mobility management network element reselects a serving gateway, and sends a session setup request message to the reselected serving gateway, where the session setup message includes information about a PDN connection, of the user equipment, that needs to be recovered, so that the PDN connection is reestablished on the reselected serving gateway.

Alternatively, if the user equipment is performing a handover procedure, the mobility management network element refuses a handover request message or a reallocation request message, and changes the user equipment into an idle state; and then the mobility management network element reselects a serving gateway, and sends a session setup request message to the reselected serving gateway, where the session setup message includes information about a PDN connection, of the user equipment, that needs to be recovered, so that the PDN connection is reestablished on the reselected serving gateway.

Optionally, as another embodiment, the data gateway and the serving gateway are jointly deployed, and some PDN connections of all PDN connections of the user equipment are established on a reset data gateway.

If the data gateway is reset, the reestablishing unit 420 reselects a serving gateway, and sends a session setup request message to the reselected serving gateway, where the session setup request message carries information about a PDN connection established by the user equipment on another data gateway that is not reset, so that the reselected serving gateway establishes a PDN connection to the another data gateway that is not reset, where the reselected serving gateway is a reset and restarted serving gateway or another serving gateway.

Alternatively, as another embodiment, the data gateway and the serving gateway are jointly deployed, and some PDN connections of all PDN connections of the user equipment are established on a reset data gateway.

If the data gateway is reset, the reestablishing unit 420 sends a deactivation request message to the user equipment, and deletes the PDN connections on the reset data gateway, so that the user equipment reestablishes the PDN connections.

Alternatively, as another embodiment, the mobility management network element 400 is an MME, the data gateway and the serving gateway are jointly deployed, or the data gateway and the serving gateway are separately deployed, and all PDN connections of the user equipment are established on a reset data gateway. If the data gateway is reset, the reestablishing unit 420 sends a detach request message to the user equipment, where the detach request message carries a cause value of a re-attach request, so that the user equipment deletes all PDN connections according to the detach request message and reinitiates a PDN establishment request.

Alternatively, as another embodiment, the mobility management network element 400 is an SGSN, the data gateway and the serving gateway are jointly deployed, or the data gateway and the serving gateway are separately deployed, and all PDN connections of the user equipment are established on a reset data gateway. If the data gateway is reset, the reestablishing unit 420 sends a PDP deactivation message to the user equipment, where the PDP deactivation message carries a cause value of a reactivation request, so that the user equipment deletes all PDP connections according to the PDP deactivation message and reinitiates an activate PDP request.

Optionally, as another embodiment, the data gateway and the serving gateway are separately deployed, and some PDN connections of all PDN connections of the user equipment are established on a reset data gateway.

If the data gateway is reset, the reestablishing unit 420 sends a deactivation request message to the user equipment, and deletes the PDN connections on the reset data gateway, so that the user equipment reestablishes the PDN connections.

Optionally, as another embodiment, the mobility management network element in this embodiment of the present invention further includes a determining unit 440.

Specifically, the determining unit 440 is configured to determine, according to identification information of a data gateway and identification information of a serving gateway, whether the data gateway and the serving gateway are jointly deployed, where the identification information of the data gateway and the identification information of the serving gateway include an IP address of the data gateway and an IP address of the serving gateway, and/or a fully qualified domain name of the data gateway and a fully qualified domain name of the serving gateway.

Optionally, as another embodiment, the identifier of the user equipment includes at least one of an international mobile subscriber identity IMSI of the user equipment, a mobile station international ISDN number MSISDN, or an international mobile equipment identity IMEI; and the identifier of the mobility management network element includes at least one of an IP address of the mobility management network element, a globally unique identifier of the mobility management network element, or a fully qualified domain name FQDN of the mobility management network element.

Figure 5:
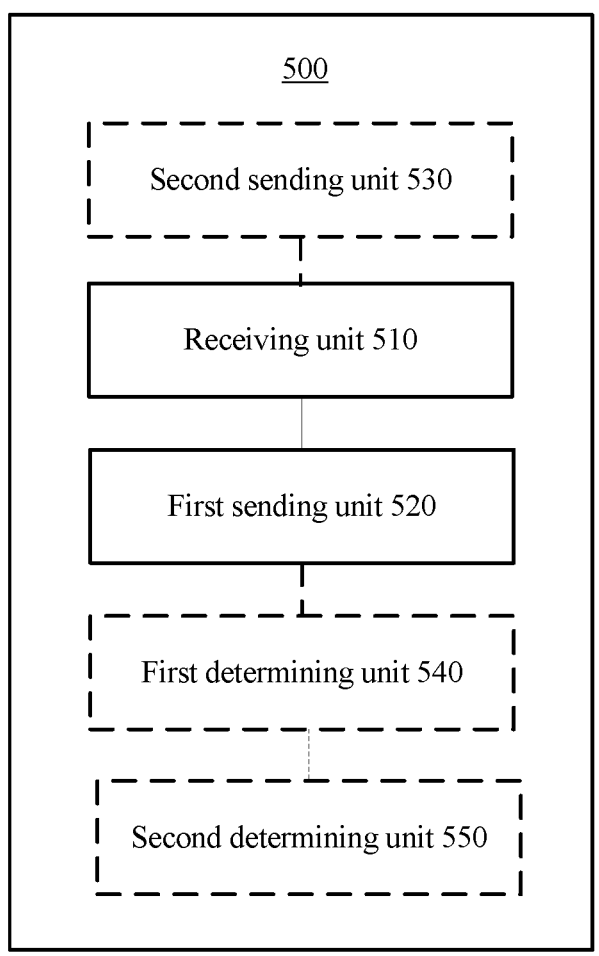
FIG. 5 is a schematic block diagram of a data gateway according to an embodiment of the present disclosure.

FIG. 5 is a schematic block diagram of a data gateway according to an embodiment of the present invention. A data gateway 500 shown in FIG. 5 includes a receiving unit 510 and a first sending unit 520.

Specifically, the receiving unit 510 is configured to receive a downlink data packet; and the first sending unit 520 is configured to send a first message to a reset central server, where the first message includes first identification information of user equipment, so that the reset central server reestablishes a PDN connection of the user equipment according to the first message.

Therefore, in this embodiment of the present invention, a first message may be determined according to header information of a downlink data packet, where the first message includes first identification information of user equipment; then a data gateway sends the first message to a reset central server, so that the reset central server recovers a PDN connection. Because an affected PDN connection can be reestablished in a timely manner, user experience is improved.

Optionally, as another embodiment, the data gateway in this embodiment of the present disclosure further includes a second sending unit 530.

Specifically, the second sending unit 530 is configured to send, to the reset central server, a first registration message used to register information about the user equipment, where the first registration message includes an IP address of the user equipment and an identifier of the user equipment.

In other words, in this embodiment of the present disclosure, a registration process of the user equipment needs to be completed before the data gateway is reset and/or a serving gateway is reset, and information about an original PDN is registered at the reset central server. Specifically, that the data gateway registers the information about the user equipment includes: sending, by the data gateway to the reset central server, the first registration message used to register the information about the user equipment, where the first registration message includes the IP address of the user equipment and the identifier of the user equipment.

Specifically, the data gateway may send, to the reset central server according to a selection policy, the first registration message used to register the information about the user equipment, where the selection policy includes registering information about a PDN connection, of an IP multimedia subsystem IMS access point name APN, of user equipment, or registering information about a PDN connection of high-level user equipment VIP, or registering all reset PDN connections of user equipment.

Optionally, as another embodiment, the second sending unit 530 sends, to the reset central server according to a selection policy, the first registration message used to register the information about the user equipment, where the selection policy includes registering information about a PDN connection, of an IMS APN, of user equipment, or registering information about a PDN connection of VIP. The identifier of the user equipment includes at least one of an international mobile subscriber identity IMSI of the user equipment, a mobile station international ISDN number MSISDN, or an international mobile equipment identity IMEI.

Optionally, as another embodiment, the first registration message further includes an access point name APN corresponding to the PDN connection, and the first message further includes the APN.

Optionally, as another embodiment, the data gateway in this embodiment of the present disclosure further includes a first determining unit 540.

Specifically, the first determining unit 540 is configured to determine that the data gateway is reset, determine that the downlink data packet is from a trusted APN, and determine the IP address of the user equipment in a header of the downlink data packet, where the first identification information includes the IP address of the user equipment.

Optionally, as another embodiment, the data gateway in this embodiment of the present disclosure further includes a second determining unit 550.

Specifically, the second determining unit 550 is configured to determine that a serving gateway is reset; determine, by querying a context of the PDN connection of the user equipment corresponding to the downlink data packet, the identifier of the user equipment corresponding to the downlink data packet; and determine the first message according to the identifier of the user equipment, where the first identification information includes the identifier of the user equipment.

Specifically, the data gateway learns, by using a reset counter in a signaling message or a path detection mechanism, that the serving gateway is reset. Alternatively, the data gateway sends the downlink data packet to the serving gateway, and because the serving gateway cannot find the information about the user equipment corresponding to the downlink data packet, the serving gateway sends an error indication message to the data gateway. Then the data gateway learns that an exception occurs in the serving gateway.

Optionally, as another embodiment, the first message further includes a reset indication, and the reset indication represents that the serving gateway is reset, or represents the error indication message sent by the serving gateway to the data gateway, where the error indication message represents that the serving gateway is reset.

Optionally, as another embodiment, the identifier of the user equipment includes at least one of an international mobile subscriber identity IMSI of the user equipment, a mobile station international ISDN number MSISDN, or an international mobile equipment identity IMEI.

Figure 6:
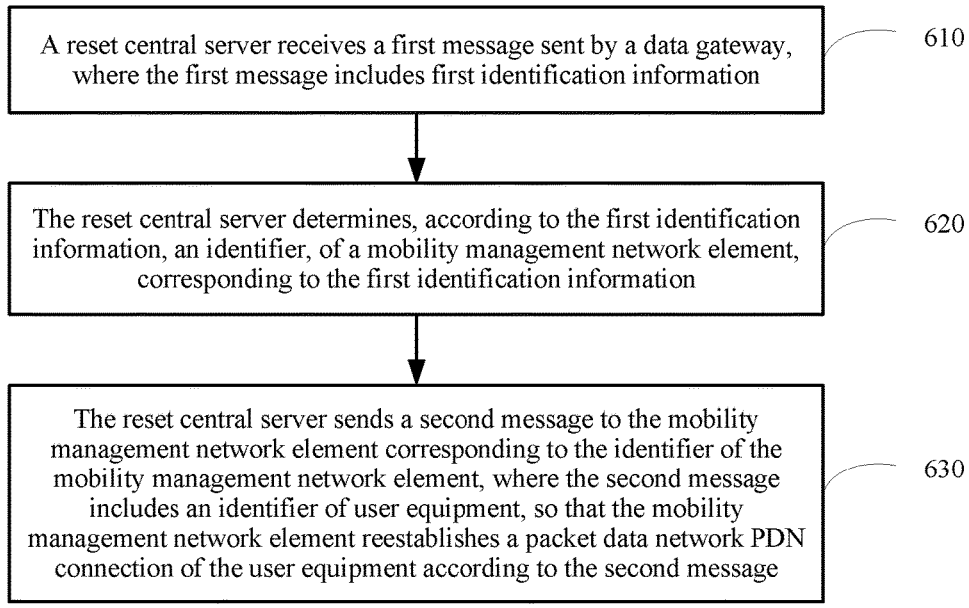
FIG. 6 is a schematic flowchart of a PDN connection reestablishing method according to an embodiment of the present disclosure.
Figure 7:
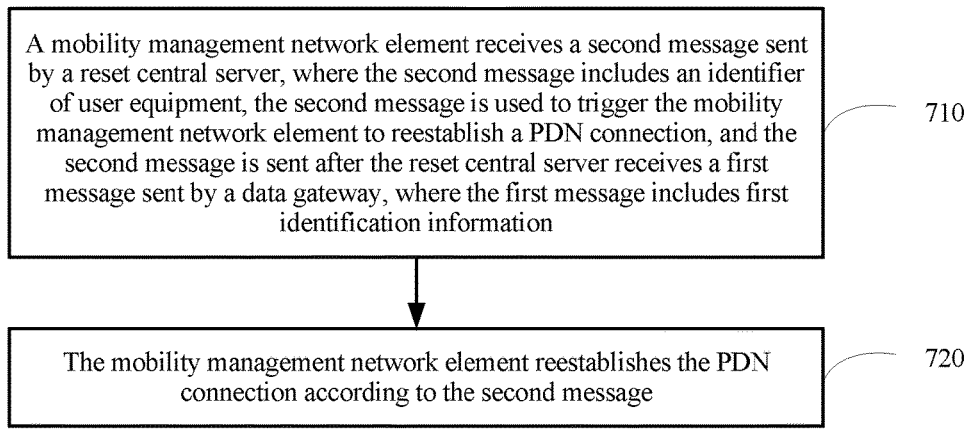
FIG. 7 is a schematic flowchart of a PDN connection reestablishing method according to another embodiment of the present disclosure.
Figure 8:
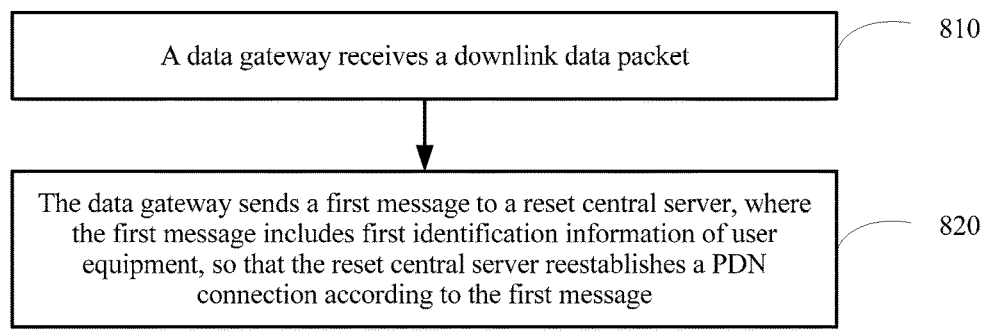
FIG. 8 is a schematic flowchart of a PDN connection reestablishing method according to another embodiment of the present disclosure.

The following describes a PDN connection reestablishing method in the embodiments of the present disclosure from a perspective of a reset central server with reference to FIG. 6, from a perspective of a mobility management network element with reference to FIG. 7, and from a perspective of a data gateway with reference to FIG. 8.

FIG. 6 is a schematic flowchart of a PDN connection reestablishing method according to an embodiment of the present disclosure. The method shown in FIG. 6 is executed by a reset central server, and the method shown in FIG. 6 includes the following steps.

610. A reset central server receives a first message sent by a data gateway, where the first message includes first identification information.

Specifically, after receiving a downlink data packet, the data gateway determines that the data gateway is reset and/or a serving gateway is reset, and the data gateway sends the first message to the reset central server.

620. The reset central server determines, according to the first identification information, an identifier, of a mobility management network element, corresponding to the first identification information.

Specifically, the reset central server may search, information previously stored when information about user equipment is registered, for the identifier, of the mobility management network element, matching the first identification information.

630. The reset central server sends a second message to the mobility management network element corresponding to the identifier of the mobility management network element, where the second message includes an identifier of user equipment, so that the mobility management network element reestablishes a packet data network PDN connection of the user equipment according to the second message.

Specifically, after registration of the information about the user equipment is completed, after a network device (the data gateway and/or the serving gateway) is reset, and after the data gateway receives the downlink data packet, the reset central server receives the first message sent by the data gateway, where the first message includes the first identification information. Then the reset central server searches, according to the first identification information, the information stored when the information about the user equipment is registered for the identifier, of the mobility management network element, corresponding to the first identification information, and sends the second message to the mobility management network element corresponding to the identifier of the mobility management network element, where the second message includes the identifier of the user equipment, so that the mobility management network element reestablishes the packet data network PDN connection according to the second message, and recovery of a PDN connection affected by reset of the network device (the data gateway and/or the serving gateway) is implemented.

Therefore, in this embodiment of the present disclosure, a reset central server may receive a first message sent by a data gateway; search, according to first identification information included in the first message, stored information for an identifier, of a mobility management network element, corresponding to the first identification information; and send a second message to the mobility management network element corresponding to the identifier of the mobility management network element, where the second message includes an identifier of user equipment, so that the mobility management network element reestablishes a packet data network PDN connection according to the second message. Because an affected PDN connection can be reestablished in a timely manner, user experience is improved.

It should be understood that, the reset central server in this embodiment of the present disclosure may be an independently deployed logical entity, or may be jointly deployed with another network element in a network, for example, the reset central server may be a device such as HSS or a PCRF. Information about the reset central server may be configured on the data gateway, or may be configured and delivered to the data gateway by using another network element such as an HSS, a PCRF, or a network management operation and maintenance O&M (Operation and Maintenance) center. The data gateway sends a message to a corresponding reset central server according to the information.

Information about a user/PDN connection affected by node reset is reestablished by using existing solutions, so that a downlink data packet can be sent to the user equipment, and methods are as follows.

When the serving gateway is reset, reestablishing methods are as follows: Method 1: After the mobility management network element learns that the serving gateway is reset, for affected user equipment, the mobility management network element reselects a serving gateway, initiates a serving gateway handover procedure, and reestablishes a context of the user equipment on the selected serving gateway. After learning that the serving gateway is reset, the data gateway reserves, for a period of time, a context of a PDN connection affected by reset of the serving gateway, and waits for the serving gateway selected by the mobility management network element to update downlink tunnel information to the data gateway. Method 2: After the data gateway learns that the serving gateway is reset, if a downlink data packet of user equipment affected by reset of the serving gateway is received, the data gateway selects a serving gateway, and sends a downlink data packet notification message to the serving gateway. The serving gateway forwards the downlink data packet notification message to the mobility management network element, and the mobility management network element reselects a serving gateway, executes a serving gateway handover procedure, and reestablishes a context of the user on the selected serving gateway. However, in the foregoing two methods, when the serving gateway is reset, for the reestablishing method 1, recovery is triggered after the mobility management network element detects that the serving gateway is reset. A reset detection mechanism may be not timely, and consequently downlink data of some user equipments cannot arrive. For the method 2, the data gateway needs to send the downlink data packet notification message to trigger recovery. However, in an actual network, the serving gateway and the data gateway are jointly deployed in most cases, and when the serving gateway is reset, the data gateway is also reset. Therefore, the data gateway cannot implement the recovery mechanism in the method 2.

When the data gateway is reset, a reestablishing method is as follows: after the serving gateway learns that the data gateway is reset, the serving gateway sends a data gateway reset notification message to the mobility management network element, where the message includes an Internet Protocol (IP address for short) of the data gateway and an IP address of the serving gateway. After receiving the message, the mobility management network element scans related PDN connections according to the IP address of the data gateway and the IP address of the serving gateway, and initiates a PDN connection deletion/user detach procedure to trigger user equipment to reestablish a PDN connection. However, when the data gateway is reset, for the recovery method, recovery is triggered after the serving gateway detects that the data gateway is reset. A problem that a detection mechanism is not timely also exists, and the method further depends on time of scanning, after the serving gateway learns that the data gateway is reset, an internal affected PDN connection; before the serving gateway learns that the data gateway is reset, a downlink data packet of user equipment may be discarded. Similarly, if the serving gateway and the data gateway are jointly deployed, when the data gateway is reset, the serving gateway is also reset, and the serving gateway cannot implement the recovery method used when the data gateway is reset.

In the foregoing reestablishing methods used when a serving gateway is reset and a data gateway is reset, a user needs to wait for a long time, and a downlink data packet cannot arrive at user equipment in a timely manner, affecting user experience. For example, in a voice call, user equipment cannot perform a called service for a long time, and service experience of the user equipment is affected. Therefore, a calling party has low satisfaction on the network and the service because of failures in attempting to contact a called party multiple times. However, in this embodiment of the present disclosure, when a data gateway is reset and/or a serving gateway is reset, a reset central server may receive a first message sent by the data gateway, where the first message includes first identification information of user equipment; search, according to the first identification information, stored information for an identifier of a mobility management network element and an identifier of the user equipment that are corresponding to the first identification information; and send a second message to the mobility management network element corresponding to the identifier of the mobility management network element, where the second message includes the identifier of the user equipment, so that the mobility management network element is triggered to reestablish a packet data network PDN connection according to the second message. An affected PDN connection can be reestablished in a timely manner, so that a downlink data packet can arrive at the user equipment in a timely manner, waiting time of a user is reduced, and user experience is improved.

Optionally, as another embodiment, the first identification information includes an Internet Protocol IP address of the user equipment or the identifier of the user equipment, and the method in this embodiment of the present disclosure further includes: receiving, by the reset central server, a first registration message that is sent by the data gateway and used to register information about the user equipment, where the first registration message includes the Internet Protocol IP address of the user equipment and the identifier of the user equipment; receiving, by the reset central server, a second registration message that is sent by the mobility management network element and used to register information about the user equipment, where the second registration message includes the identifier of the mobility management network element and the identifier of the user equipment; and associating, by the reset central server, the Internet Protocol IP address of the user equipment and the identifier of the user equipment with the identifier of the mobility management network element according to the identifier of the user equipment.

In other words, in this embodiment of the present disclosure, a registration process of the user equipment needs to be completed before the data gateway is reset and/or the serving gateway is reset, and information about a PDN is registered at the reset central server. Specifically, the reset central server may receive the first registration message that is sent by the data gateway and used to register the information about the user equipment, where the first registration message includes the Internet Protocol IP address of the user equipment and the identifier of the user equipment; the reset central server receives the second registration message that is sent by the mobility management network element and used to register the information about the user equipment, where the second registration message includes the identifier of the mobility management network element and the identifier of the user equipment; and then the reset central server enables, according to the identifier of the user equipment, information about the PDN connection to correspond to each other.

Optionally, as another embodiment, the first registration message may further include an access point name APN corresponding to the PDN connection, and in step 630, the second message further includes the APN, so that the mobility management network element reestablishes the PDN connection according to the identifier of the user equipment and the APN. In other words, when reestablishing a PDN, the mobility management network element may determine, according to information about the APN, a PDN connection that needs to be reestablished.

Optionally, as another embodiment, the first identification information may include the IP address of the user equipment and/or the identifier of the user equipment. Specifically, when the data gateway is reset, the first identification information includes the IP address of the user equipment, and in step 620, the reset central server determines, according to the IP address of the user equipment, the identifier of the mobility management network element and the identifier of the user equipment that are corresponding to the IP address of the user equipment.

Alternatively, when the serving gateway is reset, the first identification information includes the identifier of the user equipment.

Optionally, the identifier of the user equipment may include at least one of an international mobile subscriber identity IMSI of the user equipment, a mobile station international ISDN number MSISDN, or an international mobile equipment identity IMEI.

Optionally, the identifier of the mobility management network element includes at least one of an IP address of the mobility management network element, a globally unique identifier of the mobility management network element, or a fully qualified domain name FQDN of the mobility management network element.

FIG. 7 is a schematic flowchart of a PDN connection reestablishing method according to another embodiment of the present disclosure. The method shown in FIG. 7 is executed by a mobility management network element, and the method shown in FIG. 7 includes the following steps.

710. A mobility management network element receives a second message sent by a reset central server, where the second message includes an identifier of user equipment, the second message is used to trigger the mobility management network element to reestablish a PDN connection, and the second message is sent after the reset central server receives a first message sent by a data gateway, where the first message includes first identification information.

720. The mobility management network element reestablishes the PDN connection according to the second message.

Therefore, in this embodiment of the present disclosure, a mobility management network element may receive a second message sent by a reset central server, where the second message includes an identifier of user equipment, and the second message is used to trigger the mobility management network element to reestablish a PDN connection; and the mobility management network element reestablishes the PDN connection of the user equipment according to the second message. Because an affected PDN connection can be reestablished in a timely manner, user experience is improved.

Optionally, as another embodiment, the first identification information includes an Internet Protocol IP address of the user equipment or the identifier of the user equipment, and the method in this embodiment of the present disclosure further includes: sending, by the mobility management network element to the reset central server, a second registration message used to register information about the user equipment, where the second registration message includes an identifier of the mobility management network element and the identifier of the user equipment.

In other words, in this embodiment of the present disclosure, a registration process of the user equipment needs to be completed before the data gateway is reset and/or a serving gateway is reset, and information about a PDN is registered at the reset central server. Specifically, that the mobility management registers the information about the user equipment includes: sending, by the mobility management network element to the reset central server, the second registration message used to register the information about the user equipment, where the second registration message includes the identifier of the mobility management network element and the identifier of the user equipment.

Specifically, the mobility management network element sends, to the reset central server according to a first selection policy, the second registration message used to register the information about the user equipment, where the first selection policy includes registering information about user equipment that establishes a PDN connection, of an IP multimedia subsystem IMS access point name APN, of the user equipment, or registering information about high-level user equipment VIP.

Optionally, as another embodiment, in step 720, the mobility management network element determines, according to a second selection policy, a PDN connection that needs to be reestablished, where the second selection policy includes recovering the PDN connection of the IMS APN, or recovering a PDN connection of a VIP user.

It should be understood that the identifier of the user equipment may include at least one of an international mobile subscriber identity IMSI of the user equipment, a mobile station international ISDN number MSISDN, or an international mobile equipment identity IMEI. The identifier of the mobility management network element may include at least one of an IP address of the mobility management network element, a globally unique identifier of the mobility management network element, or a fully qualified domain name FQDN of the mobility management network element.

Optionally, as another embodiment, the second registration message further includes an access point name APN corresponding to the PDN connection of the user equipment, and a correspondence includes a correspondence among the Internet Protocol IP address of the user equipment and/or the identifier of the user equipment, the APN, and the identifier of the mobility management network element; and the second message further includes the APN. In step 720, the mobility management network element reestablishes the PDN connection according to the identifier of the user equipment and the APN.

Optionally, as another embodiment, the second message further includes a reset indication, and the reset indication is used to represent that the serving gateway is reset. In step 720, the mobility management network element reselects a serving gateway, and sends a session setup request message to the reselected serving gateway, where the session setup message includes information about a PDN connection, of the user equipment, that needs to be recovered, so that the PDN connection is reestablished on the reselected serving gateway.

The reselected serving gateway is a reset and restarted serving gateway or another serving gateway. In other words, in step 720, the mobility management network element reselects a serving gateway and reestablishes a context of a user.

Further, in an actual application, the mobility management network element may reestablish the PDN connection according to a status of the user equipment.

Specifically, when reestablishing the PDN connection, if the user equipment is in a state being connected to the mobility management network element, the mobility management network element first releases a signaling connection to the user equipment, and changes the user equipment into an idle state; and then the mobility management network element reselects a serving gateway, and sends the session setup request message to the reselected serving gateway, where the session setup message includes the information about the PDN connection, of the user equipment, that needs to be recovered, so that the PDN connection is reestablished on the reselected serving gateway.

Alternatively, if the user equipment is initiating a service request, a tracking area update procedure in which the mobility management network element remains unchanged, or a routing area update procedure in which the mobility management network element remains unchanged, the mobility management network element first reselects a serving gateway, and sends a session setup request message to the reselected serving gateway, where the session setup message includes information about a PDN connection, of the user equipment, that needs to be recovered, so that the PDN connection is reestablished on the reselected serving gateway; and then the mobility management network element executes a subsequently initiated service request, tracking area update procedure in which the mobility management network element remains unchanged, or routing area update procedure in which the mobility management network element remains unchanged.

Alternatively, if the user equipment is initiating a tracking area update procedure in which the mobility management network element is changed or a routing area update procedure in which the mobility management network element is changed, the mobility management network element notifies a target-side mobility management network element that a procedure of reselecting a serving gateway needs to be executed; and the target mobility management network element reselects a serving gateway, and sends a session setup request message to the reselected serving gateway, where the session setup message includes information about a PDN connection, of the user equipment, that needs to be recovered, so that the PDN connection is reestablished on the reselected serving gateway.

Alternatively, if the user equipment is performing a handover procedure, the mobility management network element refuses a handover request message or a reallocation request message, and changes the user equipment into an idle state; and then the mobility management network element reselects a serving gateway, and sends a session setup request message to the reselected serving gateway, where the session setup message includes information about a PDN connection, of the user equipment, that needs to be recovered, so that the PDN connection is reestablished on the reselected serving gateway.

Optionally, as another embodiment, the data gateway and the serving gateway are jointly deployed, and some PDN connections of all PDN connections of the user equipment are established on a reset data gateway. In step 720, if the data gateway is reset, the mobility management network element reselects a serving gateway, and sends a session setup request message to the reselected serving gateway, where the session setup request message carries information about a PDN connection established by the user equipment on another data gateway that is not reset, so that the reselected serving gateway establishes a PDN connection to the another data gateway that is not reset, where the reselected serving gateway is a reset and restarted serving gateway or another serving gateway.

Alternatively, as another embodiment, the data gateway and the serving gateway are jointly deployed, and some PDN connections of all PDN connections of the user equipment are established on a reset data gateway. In step 720, if the data gateway is reset, the mobility management network element sends a deactivation request message to the user equipment, and deletes the PDN connections on the reset data gateway, so that the user equipment reestablishes the PDN connections.

Alternatively, as another embodiment, the mobility management network element is an MME, the data gateway and the serving gateway are jointly deployed, or the data gateway and the serving gateway are separately deployed, and all PDN connections of the user equipment are established on a reset data gateway. In step 720, if the data gateway is reset, the mobility management network element sends a detach request message to the user equipment, where the detach request message carries a cause value of a re-attach request, so that the user equipment deletes all PDN connections according to the detach request message and reinitiates an attach procedure.

Alternatively, as another embodiment, the mobility management network element is an SGSN, the data gateway and the serving gateway are jointly deployed, or the data gateway and the serving gateway are separately deployed, and all PDN connections of the user equipment are established on a reset data gateway. In step 720, if the data gateway is reset, the mobility management network element sends a PDP deactivation message to the user equipment, where the PDP deactivation message carries a cause value of a reactivation request, so that the user equipment deletes all PDP connections according to the PDP deactivation message and reinitiates an activate PDP request.

Alternatively, as another embodiment, the data gateway and the serving gateway are separately deployed, and some PDN connections of all PDN connections of the user equipment are established on a reset data gateway. In step 720, if the data gateway is reset, the mobility management network element sends a deactivation request message to the user equipment, and deletes the PDN connections on the reset data gateway, so that the user equipment reestablishes the PDN connections.

Optionally, as another embodiment, in step 720, the mobility management network element may determine, according to identification information of a data gateway and identification information of a serving gateway, whether the data gateway and the serving gateway are jointly deployed, where the identification information of the data gateway and the identification information of the serving gateway include an IP address of the data gateway and an IP address of the serving gateway, and/or a fully qualified domain name of the data gateway and a fully qualified domain name of the serving gateway.

FIG. 8 is a schematic flowchart of a PDN connection reestablishing method according to another embodiment of the present disclosure. The method shown in FIG. 8 is executed by a data gateway, and the method shown in FIG. 8 includes the following steps.

810. A data gateway receives a downlink data packet.

Specifically, the data gateway receives the downlink data packet, and the data gateway determines that the data gateway/a serving gateway is reset.

820. The data gateway sends a first message to a reset central server, where the first message includes first identification information of user equipment, so that the reset central server reestablishes a PDN connection according to the first message.

Therefore, in this embodiment of the present disclosure, a data gateway may send a first message to a reset central server, where the first message includes first identification information of user equipment, so that the reset central server recovers a PDN connection. Because an affected PDN connection can be reestablished in a timely manner, user experience is improved.

Optionally, as another embodiment, the method in this embodiment of the present disclosure further includes: sending, by the data gateway to the reset central server, a first registration message used to register information about the user equipment, where the first registration message includes an IP address of the user equipment and an identifier of the user equipment.

In other words, in this embodiment of the present disclosure, a registration process of the user equipment needs to be completed before the data gateway is reset and/or the serving gateway is reset, and information about an original PDN is registered at the reset central server. Specifically, that the data gateway registers the information about the user equipment includes: sending, by the data gateway to the reset central server, the first registration message used to register the information about the user equipment, where the first registration message includes the IP address of the user equipment and the identifier of the user equipment.

Specifically, the data gateway may send, to the reset central server according to a selection policy, the first registration message used to register the information about the user equipment, where the selection policy includes registering information about a PDN connection, of an IP multimedia subsystem IMS access point name APN, of user equipment, or registering information about a PDN connection of high-level user equipment VIP, or registering information about all reset PDN connections of user equipment.

The identifier of the user equipment includes at least one of an international mobile subscriber identity IMSI of the user equipment, a mobile station international ISDN number MSISDN, or an international mobile equipment identity IMEI.

Optionally, as another embodiment, the first registration message further includes an access point name APN corresponding to the PDN connection, and the first message further includes the APN.

Further, as another embodiment, the data gateway sends, to the reset central server according to a selection policy, the first registration message used to register the information about the user equipment, where the selection policy includes information about a PDN connection, of an IMS APN, of user equipment, or information about a PDN connection of VIP.

Optionally, as another embodiment, the method in this embodiment of the present disclosure further includes: determining, by the data gateway, that the data gateway is reset; and determining, by the data gateway, that the downlink data packet is from a trusted APN, and determining the IP address of the user equipment in a header of the downlink data packet, where the first identification information includes the IP address of the user equipment.

Alternatively, as another embodiment, the method in this embodiment of the present disclosure further includes: determining, by the data gateway, that the serving gateway is reset; and determining, by the data gateway by querying a context of the PDN connection of the user equipment corresponding to the downlink data packet, the identifier of the user equipment corresponding to the downlink data packet, where the first identification information includes the identifier of the user equipment.

Specifically, the data gateway learns, by using a reset counter in a signaling message or a path detection mechanism, that the serving gateway is reset. Alternatively, the data gateway sends the downlink data packet to the serving gateway, and because the serving gateway cannot find the information about the user equipment corresponding to the downlink data packet, the serving gateway sends an error indication message to the data gateway. Then the data gateway learns that an exception occurs in the serving gateway.

Further, the first message further includes a reset indication, and the reset indication is used to represent that the serving gateway is reset, or represents the error indication message sent by the serving gateway to the data gateway, where the error indication message represents that the serving gateway is reset.

The foregoing describes in detail a PDN connection reestablishing method in the embodiments of the present disclosure from a perspective of a reset central server with reference to FIG. 6, from a perspective of a mobility management network element with reference to FIG. 7, and from a perspective of a data gateway with reference to FIG. 8. It should be noted that examples in FIG. 6 to FIG. 8 are merely intended to help a person skilled in the art understand the embodiments of the present disclosure instead of limiting the embodiments of the present disclosure to a specific exemplified value or a specific exemplified scenario. A person skilled in the art certainly can make various modifications or changes according to examples provided in FIG. 6 to FIG. 8, and such modifications or changes also fall within the protection scope of the present disclosure. The following describes the embodiments of the present disclosure in more detail with reference to a specific example.

Figure 9:
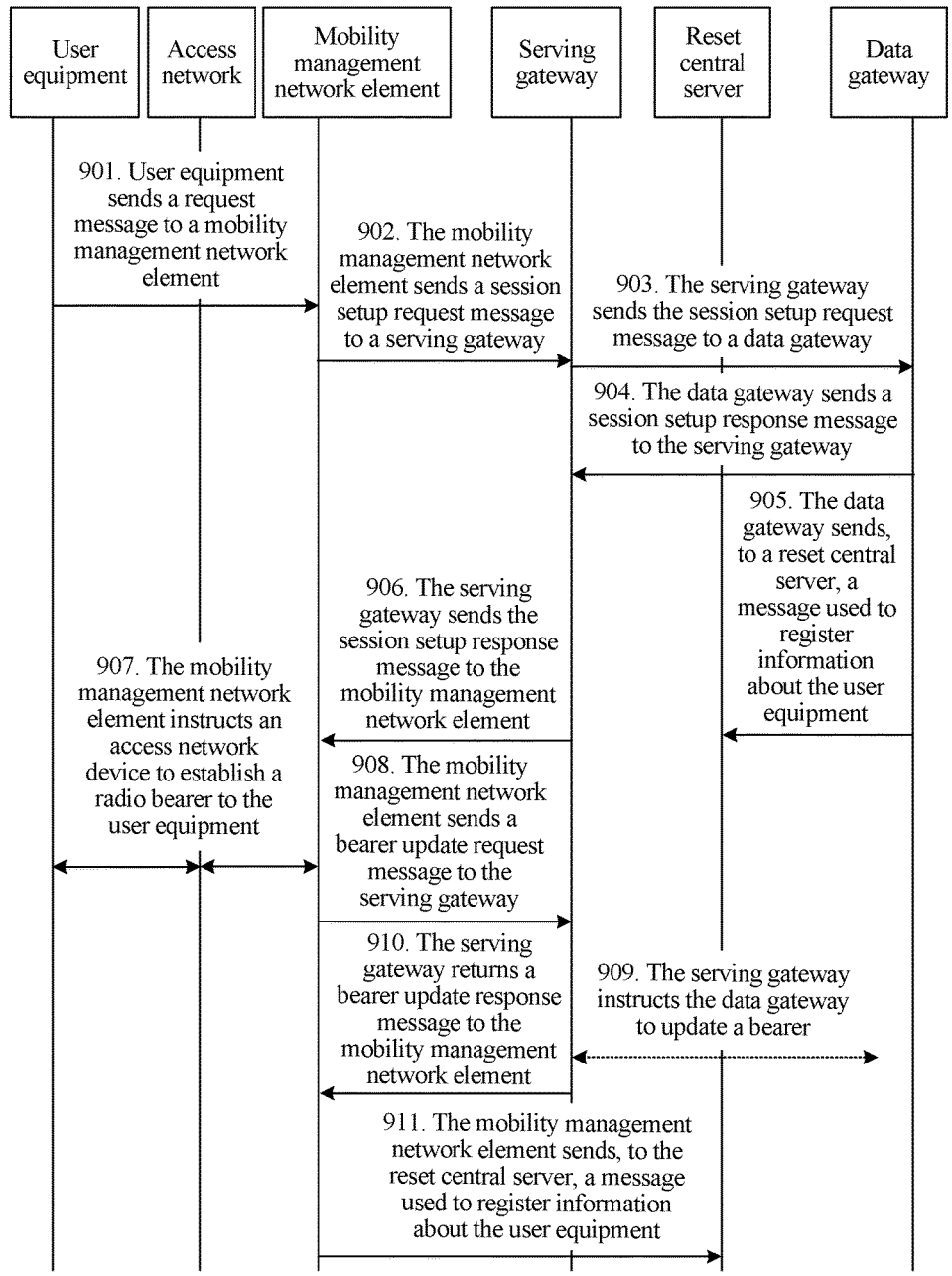
FIG. 9 is a flowchart of registering information about user equipment according to an embodiment of the present disclosure.

FIG. 9 is a flowchart of registering information about user equipment according to an embodiment of the present disclosure. A procedure shown in FIG. 9 is a procedure of registering information about user equipment in an EPS network. An access network in the figure may be 3GPP access of a GERAN, and a corresponding access network device is a BSS; or an access network may be 3GPP access of a UTRAN, and a corresponding access network device is an RNS; or an access network may be 3GPP access of an E-UTRAN, and a corresponding access network device is an evolved NodeB (eNodeB). A mobility management network element may be an S4 SGSN or an MME, a serving gateway may be an SGW, and a data gateway may be a PGW. As shown in FIG. 9, the procedure includes the following steps.

901. User equipment sends a request message to a mobility management network element.

The user equipment initiates a connection establishment procedure, and specifically, the user equipment sends an attach request or a Packet Data Protocol (PDP) activation request or a PDN connection establishment request message to the mobility management network element.

902. The mobility management network element sends a session setup request message to a serving gateway.

Specifically, after receiving the request message sent by the user equipment, the mobility management network element sends the session setup request message to the serving gateway according to the request message.

903. The serving gateway sends the session setup request message to a data gateway.

Specifically, after receiving the request message sent by the mobility management network element, the serving gateway sends the session setup request message to the data gateway according to the request message.

904. The data gateway sends a session setup response message to the serving gateway.

Specifically, after the data gateway receives the session setup request message sent by the serving gateway, the data gateway establishes a PDN connection of the user equipment, and sends the session setup response message to the serving gateway.

905. The data gateway sends, to a reset central server, a message used to register information about the user equipment.

Specifically, the message includes an IP address of the user equipment and an identifier of the user equipment. In addition, the message may further include information such as an access point name (APN) corresponding to the PDN connection.

The identifier of the user equipment may be at least one of an International Mobile Subscriber Identification Number (IMSI), a Mobile Subscriber International ISDN/PSTN number (MSISDN), or an international mobile equipment identity (IMEI).

It should be noted that, the reset central server node may be an independently deployed logical entity, or may be jointly deployed with another network element in a network, for example, the reset central server may be a device such as a HSS or a PCRF. Information about the reset central server may be configured on the data gateway, or may be delivered to the data gateway by using another network element such as an HSS, a PCRF, or a network management O&M center. The data gateway sends a message to a corresponding reset central server according to the information. The information about the reset central server may be an IP address of the reset central server, a globally unique identifier of the reset central server, a fully qualified domain name (FQDN) of the reset central server, or the like.

Further, the data gateway may select a PDN connection according to a selection policy, and for a PDN connection that complies with the selection policy, the data gateway registers information about user equipment at the reset central server. For example, only information about a PDN connection, of an IP multimedia subsystem (IMS) APN, of user equipment is registered, and for another example, only information about a PDN of high-level user equipment (Very Important People, VIP) is registered. The selection policy may be preconfigured on the data gateway, or may be obtained from another network element such as an HSS or a PCRF.

906. The serving gateway sends the session setup response message to the mobility management network element.

Specifically, the serving gateway sets up a session of the user equipment, and returns the session setup response message to the mobility management network element.

907. The mobility management network element instructs an access network to establish a radio bearer.

Specifically, the mobility management network element instructs the access network to establish a bearer between the access network and the serving gateway, and the access network further establishes a radio bearer between the access network and the user equipment.

908. The mobility management network element sends a bearer update request message to the serving gateway.

Specifically, the mobility management network element sends the bearer update request message to the serving gateway, and the bearer update request message may be used to establish a downlink data forwarding channel of the PDN connection.

909. The serving gateway instructs the data gateway to update a bearer.

Specifically, the serving gateway instructs the data gateway to update the bearer, and if the access network is handed over from a non-3GPP network, the bearer update request message may be used to instruct the data gateway to start data packet forwarding.

910. The serving gateway returns a bearer update response message to the mobility management network element.

911. The mobility management network element sends, to the reset central server, a message used to register information about the user equipment.

Specifically, the mobility management network element sends, to the reset central server, the message used to register the information about the user equipment, where the message includes the identifier of the user equipment and an identifier of the mobility management network element, and may further include other information about the user equipment, for example, a tracking area list of the user equipment. The identifier of the mobility management network element may be an IP address of the mobility management network element, a globally unique identifier of the mobility management network element, a fully qualified domain name (FQDN) of the mobility management network element, or the like. The information about the reset central server may be configured on the mobility management network element, or may be delivered to the mobility management network element by using another network element such as an HSS, a PCRF, or a network management O&M center. The mobility management network element sends a message to a corresponding reset central server according to the information.

The reset central server performs association by using the identifier of the user equipment, and associates the information that is about the user equipment and is registered by the data gateway with the information that is about the user equipment and is registered by the mobility management network element.

Further, the mobility management network element may select user equipment according to a selection policy, and register information about the user equipment at the reset central server. For example, only information about user equipment that establishes a PDN connection of an IP multimedia subsystem (IMS) APN is registered, and for another example, only information about high-level user equipment (Very Important People, VIP) is registered. The selection policy may be preconfigured on the mobility management network element, or may be obtained from another network element such as an HSS or a PCRF.

It should be noted that, the example in FIG. 9 is intended to help a person skilled in the art better understand this embodiment of the present disclosure, instead of limiting the scope of this embodiment of the present disclosure. Apparently, a person skilled in the art can perform various equivalent modifications or changes according to the example given in FIG. 9, and such modifications or changes also fall within the scope of the embodiments of the present disclosure.

It should be understood that sequence numbers of the foregoing processes do not mean execution sequences. The execution sequences of the processes should be determined according to functions and internal logic of the processes, and should not be construed as any limitation on the implementation processes of the embodiments of the present disclosure. For example, a time sequence of step 905 and step 911 may be adjusted, step 905 is not limited to be performed after step 904, and step 911 is not limited to be performed after step 910. For another example, the serving gateway may not instruct the data gateway to update the bearer. That is, step 909 may not be performed. This embodiment of the present disclosure is not limited thereto.

The foregoing process is a procedure of registering information about user equipment in an attach request, a PDN connection establishment request, or a PDP activation procedure of the user equipment. Based on the foregoing description, when a network device (a data gateway and/or a serving gateway) is reset, a recovery procedure of a PDN connection of user equipment is described in the following.

Figure 10:
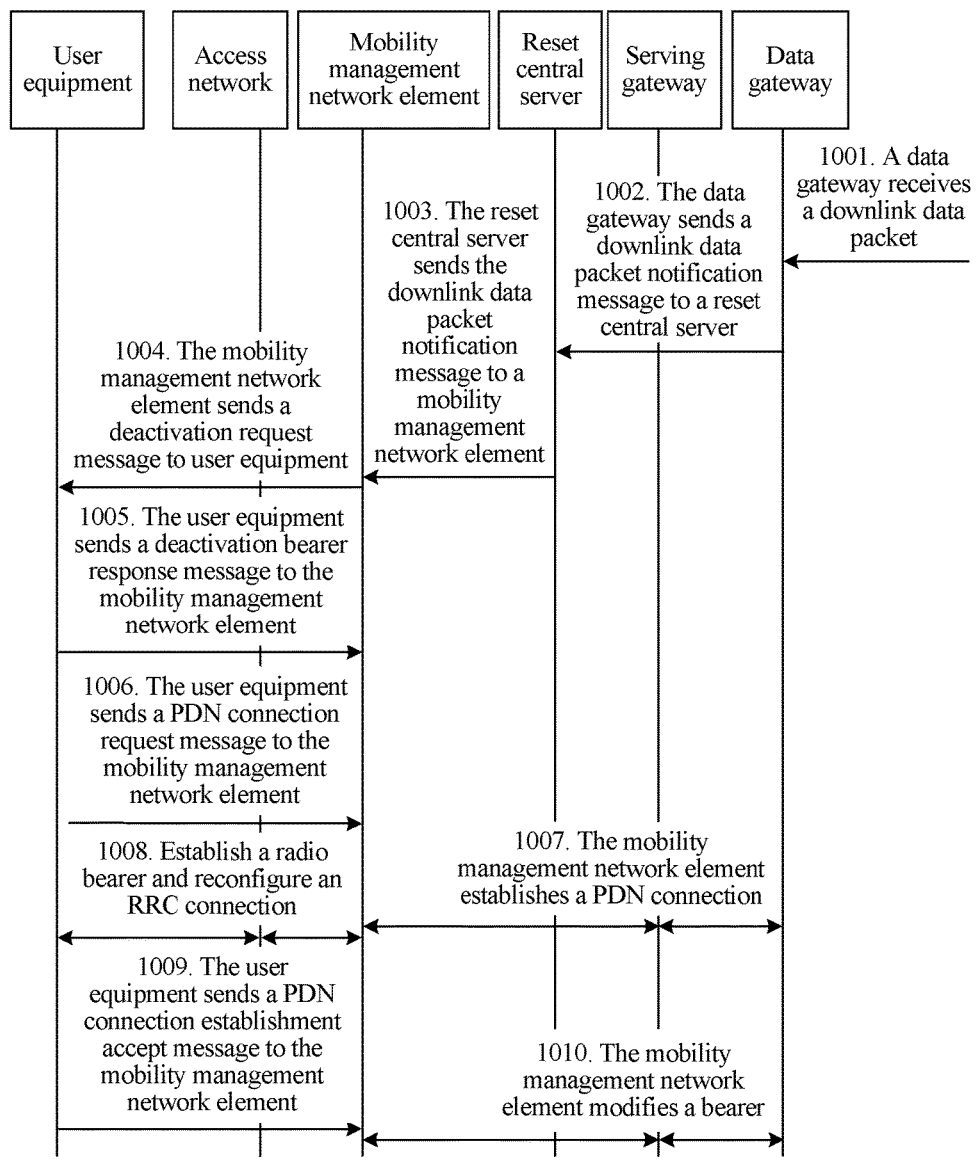
FIG. 10 is a schematic flowchart of a PDN connection reestablishing method according to another embodiment of the present disclosure.

Specifically, FIG. 10 is a procedure of recovery of a PDN connection of user equipment after a data gateway is reset when the data gateway and a serving gateway are separately deployed. Specifically, FIG. 10 is a schematic flowchart of a PDN connection reestablishing method according to another embodiment of the present disclosure. The method shown in FIG. 10 includes the following steps.

1001. A data gateway receives a downlink data packet.

Specifically, after the data gateway is reset, the data gateway receives the downlink data packet, and the data gateway locates a context of a PDN connection of user equipment according to header information such as a destination IP address of the downlink data packet. Because the data gateway is reset, data, of the context of the PDN connection, previously stored in the data gateway is lost. Therefore, the data gateway cannot locate the context of the PDN connection.

1002. The data gateway sends a downlink data packet notification message to a reset central server.

Specifically, the data gateway determines whether the downlink data packet is from a trusted APN. If the downlink data packet is from the trusted APN, the data gateway sends the downlink data packet notification message to the reset central server, where the message includes an IP address of the user equipment, that is, the destination IP address of the downlink data packet. If the downlink data packet is from an untrusted APN such as an attack from the Internet, the data gateway may discard the data packet. In this way, determining whether an APN is trusted can improve network security, for example, a scanning attack from the Internet may be prevented.

1003. The reset central server sends the downlink data packet notification message to a mobility management network element.

Specifically, after receiving the downlink data packet notification message of the data gateway, the reset central server searches for a stored record according to the IP address of the user equipment in the message, to find information such as an identifier of the corresponding mobility management network element, an identifier of the user equipment, and an APN of the PDN connection corresponding to the downlink data packet. The reset central server sends the downlink data packet notification message to a node corresponding to the identifier of the mobility management network element, where the message includes the identifier of the user equipment, and may further include information such as the APN.

After receiving the downlink data packet notification message, the mobility management network element queries a locally stored user context according to the identifier of the user equipment in the message, and if the message further includes the APN, the mobility management network element may find the context of the PDN connection of the corresponding user equipment according to the identifier of the user equipment and the APN. Further, the mobility management network element determines, according to a selection policy, to recover which reset PDN connections, for example, only a PDN connection corresponding to an IMS APN is recovered, all reset PDN connections of user equipment are recovered, or only a reset PDN connection of a VIP user is recovered. The policy may be preconfigured on the mobility management network element, or may be obtained from another network such as an HSS or a PCRF. Specifically, the mobility management network element determines, according to information such as an allocation/retention priority (ARP), a QoS class identifier (QCI), or an APN in the context of the user equipment or a context of a PDN connection, a PDN connection that needs to be recovered.

After determining the context of the PDN connection of the corresponding user equipment, the mobility management network element determines, according to information about a serving gateway and information about a data gateway that are in the context of the PDN connection, whether the PDN connection is established on a serving gateway and a data gateway that are jointly deployed, and specific information about the serving gateway and specific information about the data gateway may be an IP address of the serving gateway and an IP address of the data gateway, an FQDN of the serving gateway and an FQDN of the data gateway, and the like. For example, the mobility management network element compares the IP address of the serving gateway and the IP address of the data gateway, or compares the FQDN of the serving gateway and the FQDN of the data gateway. If IP addresses are the same or FQDNs are the same, it is considered that the serving gateway and the data gateway are jointly deployed; otherwise, it is considered that the serving gateway and the data gateway are separately deployed. In this embodiment, the PDN connection corresponding to the downlink data packet is established on a serving gateway and a data gateway that are separately deployed.

1004. The mobility management network element sends a deactivation request message to user equipment.

Specifically, if contexts of multiple PDN connections exist in the user equipment, and only contexts of some PDN connections are established on a reset data gateway, the mobility management network element initiates a PDN connection deactivation procedure to a PDN connection that needs to be recovered. The deactivation request message is sent to the user equipment, and the deactivation request message carries a cause value of a reactivation request, so that the user equipment deletes a corresponding PDN connection according to the deactivation request message, and reinitiates a PDN connection establishment procedure to reestablish the deleted PDN connection.

It should be noted that, if the user equipment is in an idle state, the mobility management network element first pages the user equipment, and triggers the user equipment to initiate a service request procedure. After the user equipment establishes a wireless connection to an access network, the mobility management network element sends the deactivation request message to the user equipment, and triggers the PDN connection deactivation procedure.

1005. The user equipment sends a deactivation bearer response message to the mobility management network element.

Specifically, the user equipment returns the deactivation bearer request message, and sends the deactivation bearer response message to the mobility management network element.

1006. The user equipment sends a PDN connection request message to the mobility management network element.

Specifically, the user equipment initiates the PDN connection establishment procedure, and sends the PDN connection request message to the mobility management network element, to reestablish a deactivated PDN connection.

1007. The mobility management network element establishes a PDN connection.

Specifically, the mobility management network element selects a data gateway. The data gateway may be a reset data gateway, or another data gateway. The mobility management network element sends a session setup request message to the serving gateway, where the message includes information such as an IP address of the data gateway. The serving gateway sets up a session with the data gateway, and returns a session setup response message to the mobility management network element.

1008. Establish a radio bearer and reconfigure an RRC connection.

Specifically, the mobility management network element instructs the access network to establish the radio bearer, and a Radio Resource Control (Radio Resource Control, RRC) connection is reconfigured between the access network and the user equipment.

1009. The user equipment sends a PDN connection establishment accept message to the mobility management network element.

1010. The mobility management network element modifies a bearer.

Specifically, the mobility management network element sends a bearer modification request message to the serving gateway, where the bearer modification request message includes user-plane information that is allocated by the access network, and is used to establish a downlink user-plane tunnel of the PDN connection. The user-plane information allocated by the access network includes information such as an IP address and a tunnel endpoint identifier that are of the access network. The serving gateway returns a bearer modification response message to the mobility management network element.

An entire PDN connection is reestablished by using the foregoing process, where a data gateway reselected by a mobility management network element may forward a received and resent downlink data packet, so that the downlink data packet can arrive at user equipment in a timely manner, which can reduce or avoid impact on a user, and improve user experience.

In the embodiment shown in FIG. 10, contexts of multiple PDN connections exist in user equipment, and only contexts of some PDN connections are established on a reset data gateway. If contexts of all PDN connections of user equipment are established on a reset data gateway, a mobility management network element initiates a detach procedure, and sends a detach request message to the user equipment, where the detach message carries a cause value of a re-attach request. Specifically, a method shown in FIG. 11 includes the following steps.

1101. A data gateway receives a downlink data packet.

1102. The data gateway sends a downlink data packet notification message to a reset central server.

1103. The reset central server sends the downlink data packet notification message to a mobility management network element.

Specifically, step 1101 to step 1103 are corresponding to step 1001 to step 1003. To avoid repetition, details are not described herein again.

1104. The mobility management network element sends a detach request message to user equipment.

Specifically, the mobility management network element initiates a detach procedure, and sends the detach request message to the user equipment, where the detach message carries a cause value of a re-attach request, so that the user equipment deletes all PDN connections according to the detach request message, and reattaches to a network to establish a deactivated PDN connection.

It should be noted that, if the user equipment is in an idle state, the mobility management network element first pages the user equipment, and triggers the user equipment to initiate a service request procedure. After the user equipment establishes a wireless connection to an access network, the mobility management network element sends the detach request message to the user equipment, and triggers a detach procedure.

1105. The user equipment sends a detach response message to the mobility management network element.

Specifically, the user equipment returns the detach request message, and sends the detach response message to the mobility management network element.

1106. The user equipment sends an attach request message to the mobility management network element.

Specifically, the user equipment initiates an attach procedure, and sends the attach request message to the mobility management network element.

1107. The mobility management network element establishes a PDN connection.

Specifically, the mobility management network element selects a serving gateway and a data gateway. The data gateway may be a reset data gateway, or another data gateway. The mobility management network element sends a session setup request message to the serving gateway, where the message includes information such as an IP address of the data gateway. The serving gateway sets up a session with the data gateway, and returns a session setup response message to the mobility management network element.

1108. Establish a radio bearer and reconfigure an RRC connection.

Specifically, an initial context is established between the mobility management network element and the access network, and an RRC connection is reconfigured between the access network and the user equipment.

1109. The user equipment returns an attach accept message to the mobility management network element.

1110. The mobility management network element modifies a bearer.

Specifically, the mobility management network element sends a bearer modification request message to the serving gateway, where the bearer modification request message includes user-plane information that is allocated by the access network, and is used to establish a downlink user-plane tunnel of the PDN connection. The user-plane information allocated by the access network includes information such as an IP address and a tunnel endpoint identifier that are of the access network. The serving gateway returns a bearer modification response message to the mobility management network element.

Only one PDN connection of the user equipment is reestablished in the foregoing attach procedure, and the user equipment may further reestablish another reset PDN connection by using a PDN connection establishment procedure, where specific steps are consistent with step 1007, step 1008, step 1009, and step 1010, and details are not described herein again.

An entire PDN connection is reestablished by using the foregoing process, where a data gateway reselected by a mobility management network element may forward a received and resent downlink data packet, so that the downlink data packet can arrive at user equipment in a timely manner, which can reduce or avoid impact on a user, and improve user experience.

Figure 11:
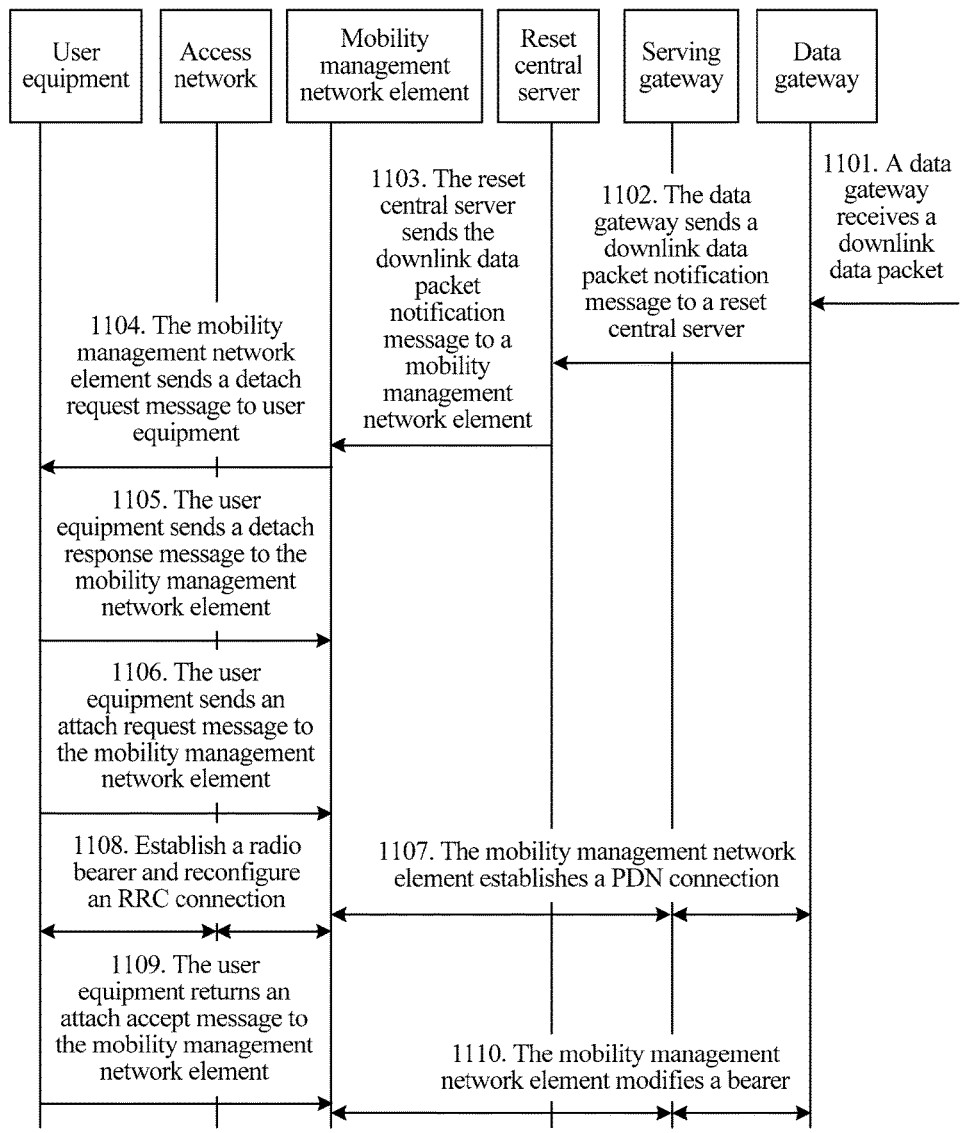
FIG. 11 is a schematic flowchart of a PDN connection reestablishing method according to another embodiment of the present disclosure.
Figure 12:
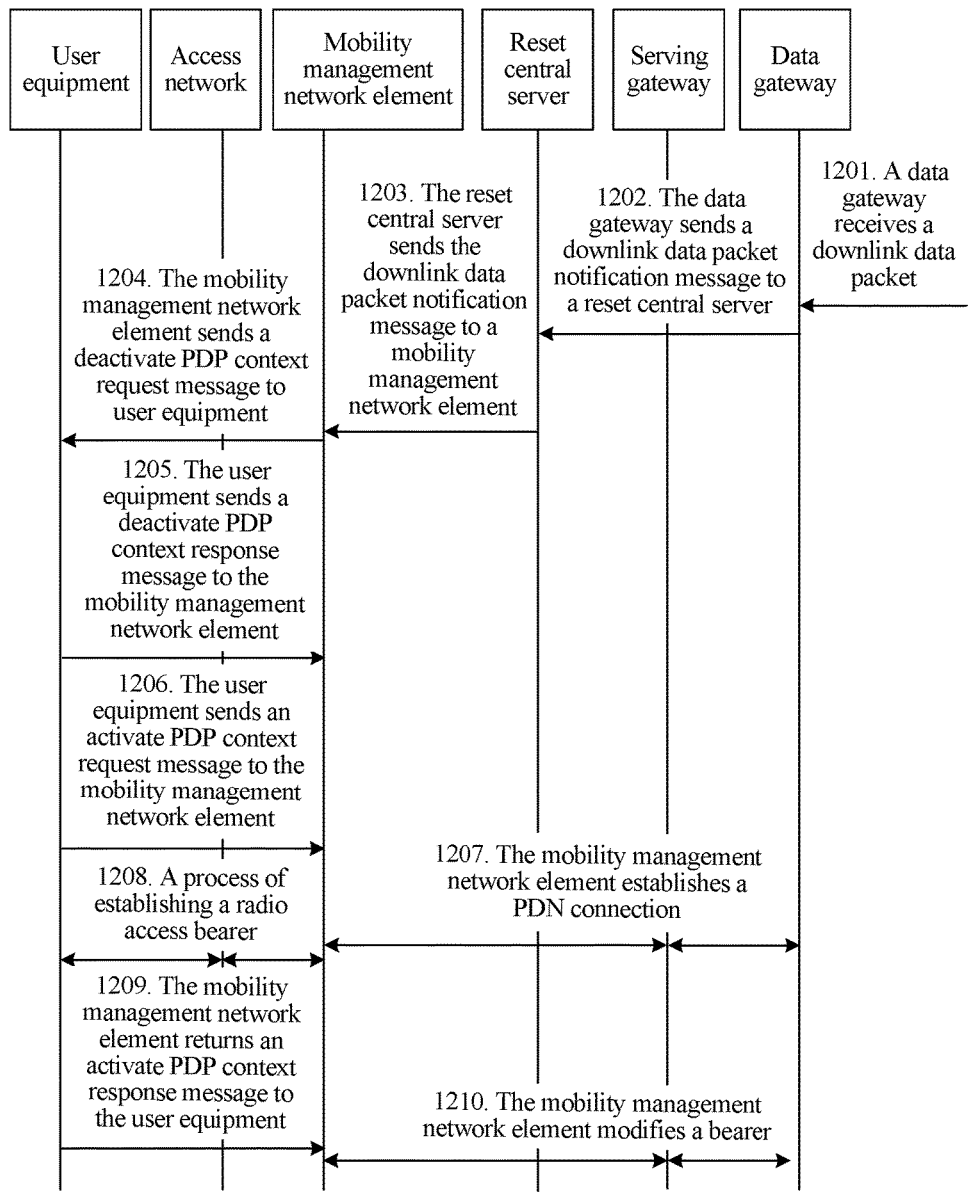
FIG. 12 is a schematic flowchart of a PDN connection reestablishing method according to another embodiment of the present disclosure.

It should be noted that, examples shown in FIG. 10 and FIG. 11 are scenarios in which a mobility management network element is an MME, and when the mobility management network element is an SGSN, regardless of whether contexts of some PDN connections or contexts of all PDN connections of user equipment need to be recovered, the SGSN triggers only a PDN connection deletion procedure. Corresponding to a PDN connection deletion procedure triggered by the MME, step 1004 or 1104 is modified to be as follows: The SGSN sends a deactivate PDP context request message to user equipment, where the message carries a cause value of a reactivation request. Specifically, a method shown in FIG. 12 includes the following steps.

1201. A data gateway receives a downlink data packet.

1202. The data gateway sends a downlink data packet notification message to a reset central server.

1203. The reset central server sends the downlink data packet notification message to a mobility management network element.

Specifically, step 1201 to step 1203 are corresponding to step 1101 to step 1103. To avoid repetition, details are not described herein again.

1204. The mobility management network element sends a deactivate PDP context request message to user equipment.

In other words, the mobility management network element sends the deactivate PDP context request message to the user equipment, where the message carries a cause value of a reactivation request, so that the user equipment deletes a corresponding PDP context according to the deactivate PDP context request message, and reinitiates an activate PDP context procedure.

It should be noted that, if the user equipment is in an idle state, the mobility management network element first pages the user equipment, and triggers the user equipment to initiate a service request procedure. After the user equipment establishes a wireless connection to an access network, the mobility management network element sends the deactivation request message to the user equipment.

1205. The user equipment sends a deactivate PDP context response message to the mobility management network element.

1206. The user equipment sends an activate PDP context request message to the mobility management network element.

1207. The mobility management network element establishes a PDN connection.

Specifically, the mobility management network element selects a data gateway. The data gateway may be a reset data gateway, or another data gateway. The mobility management network element sends a session setup request message to a serving gateway, where the message includes information such as an IP address of the data gateway. The serving gateway sets up a session with the data gateway, and returns a session setup response message to the mobility management network element.

1208. A process of establishing a radio access bearer.

Specifically, the radio access bearer is established between the mobility management network element and the access network, and a radio bearer is established between the access network and the user equipment.

1209. The mobility management network element returns an activate PDP context response message to the user equipment.

1210. The mobility management network element modifies a bearer.

Specifically, if a direct tunnel is established between the access network and the serving gateway, the mobility management network element sends a bearer modification request message to the serving gateway, where the bearer modification request message includes user-plane information that is allocated by the access network, and is used to establish a downlink user-plane tunnel of the PDN connection. The user-plane information allocated by the access network includes information such as an IP address and a tunnel identifier that are of the access network. The serving gateway returns a bearer modification response message to the mobility management network element.

An entire PDN connection is reestablished by using the foregoing process, where a data gateway reselected by a mobility management network element may forward a received and resent downlink data packet, so that the downlink data packet can arrive at user equipment in a timely manner, which can reduce or avoid impact on a user, and improve user experience.

Figure 13:
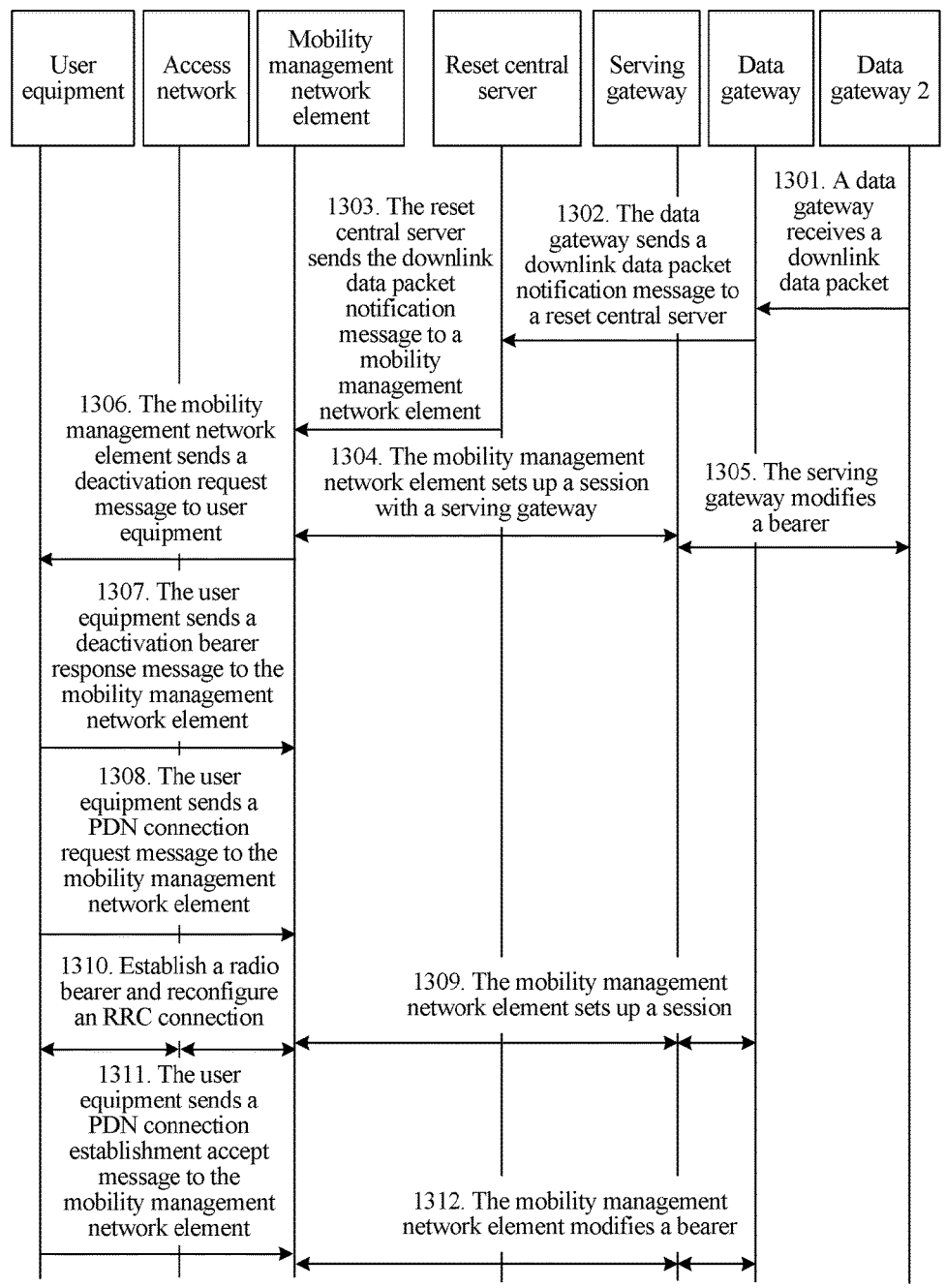
FIG. 13 is a schematic flowchart of a PDN connection reestablishing method according to another embodiment of the present disclosure.

FIG. 13 is a schematic flowchart of a PDN connection reestablishing method according to another embodiment of the present disclosure. FIG. 13 shows a scenario when a data gateway and a serving gateway are jointly deployed. Specifically, a method shown in FIG. 13 includes the following steps.

1301. A data gateway receives a downlink data packet.

Specifically, after the data gateway is reset, the data gateway receives the downlink data packet, and the data gateway locates a context of a PDN connection of user equipment according to header information such as a destination IP address of the downlink data packet. Because the data gateway is reset, data, of the context of the PDN connection, previously stored in the data gateway is lost. Therefore, the data gateway cannot locate the context of the PDN connection.

1302. The data gateway sends a downlink data packet notification message to a reset central server.

Specifically, the data gateway determines whether the downlink data packet is from a trusted APN. If the downlink data packet is from the trusted APN, the data gateway sends the downlink data packet notification message to the reset central server, where the message includes an IP address of the user equipment, that is, the destination IP address of the downlink data packet. If the downlink data packet is from an untrusted APN such as an attack from the Internet, the data gateway may discard the data packet. In this way, determining whether an APN is trusted can improve network security, for example, a scanning attack from the Internet may be prevented.

1303. The reset central server sends the downlink data packet notification message to a mobility management network element.

Specifically, after receiving the downlink data packet notification message of the data gateway, the reset central server searches for a stored record according to the IP address of the user equipment in the message, to find information such as an identifier of the corresponding mobility management network element, an identifier of the user equipment, and an APN of the PDN connection corresponding to the downlink data packet. The reset central server sends the downlink data packet notification message to a node corresponding to the identifier of the mobility management network element, where the message includes the identifier of the user equipment, and may further include information such as the APN.

After receiving the downlink data packet notification message, the mobility management network element queries a locally stored user context according to the identifier of the user equipment in the message, and if the message further includes the APN, the mobility management network element may find the context of the PDN connection of the corresponding user equipment according to the identifier of the user equipment and the APN. Further, the mobility management network element determines, according to a policy, to recover which reset PDN connections, for example, only a PDN connection corresponding to an IMS APN is recovered, all reset PDN connections of user equipment are recovered, or only a reset PDN connection of a VIP user is recovered. The policy may be preconfigured on the mobility management network element, or may be obtained from another network such as an HSS or a PCRF. The mobility management network element determines, according to information such as an ARP, a QCI, or an APN in the context of the user equipment or a context of a PDN connection, a PDN connection that needs to be recovered.

After determining the context of the PDN connection of the corresponding user equipment, the mobility management network element determines, according to information about a serving gateway and information about a data gateway that are in the context of the PDN connection, whether the PDN connection is established on a serving gateway and a data gateway that are jointly deployed, and specific information about the serving gateway and specific information about the data gateway may be an IP address of the serving gateway and an IP address of the data gateway, an FQDN of the serving gateway and an FQDN of the data gateway, and the like. In this embodiment, the PDN connection corresponding to the downlink data packet is established on a serving gateway and a data gateway that are jointly deployed.

1304. The mobility management network element sets up a session with a serving gateway.

Specifically, if only contexts of some PDN connections of the user equipment are established on a reset data gateway, the mobility management network element triggers a serving gateway handover procedure, reselects a serving gateway, and sends a session setup request to the new serving gateway, where the session setup request message carries information about a PDN connection established by the user equipment on another data gateway (such as a data gateway 2) that is not reset.

1305. The serving gateway modifies a bearer.

The serving gateway sends a bearer modification request message to the data gateway 2; and downlink tunnel information on the data gateway 2 is updated, and a PDN connection between the new serving gateway and the data gateway 2 is established. The data gateway returns a bearer modification response message.

1306. The mobility management network element sends a deactivation request message to user equipment.

Specifically, if contexts of multiple PDN connections exist in the user equipment, and only contexts of some PDN connections are established on a reset data gateway, the mobility management network element initiates a PDN connection deactivation procedure to a PDN connection that needs to be recovered. The deactivation request message is sent to the user equipment, and the deactivation request message carries a cause value of a reactivation request, so that the user equipment deletes a corresponding PDN connection according to the deactivation request message, and initiates a PDN establishment procedure to reestablish a deactivated PDN connection.

It should be noted that, if the user equipment is in an idle state, the mobility management network element first pages the user equipment, and triggers the user equipment to initiate a service request procedure. After the user equipment establishes a wireless connection to an access network, the mobility management network element sends the deactivation request message to the user equipment, and triggers the PDN connection deactivation procedure.

1307. The user equipment sends a deactivation bearer response message to the mobility management network element.

Specifically, the user equipment returns the deactivation request message, and sends the deactivation bearer response message to the mobility management network element.

1308. The user equipment sends a PDN connection request message to the mobility management network element.

Specifically, the user equipment initiates the PDN connection establishment procedure, and the user equipment sends the PDN connection request message to the mobility management network element, to reestablish a deactivated PDN connection.

1309. The mobility management network element sets up a session.

Specifically, the mobility management network element selects a data gateway. The data gateway may be a reset data gateway, or another data gateway. The mobility management network element sends a session setup request message to the serving gateway, where the message includes information such as an IP address of the data gateway. The serving gateway sets up a session with the data gateway, and returns a session setup response message to the mobility management network element.

1310. Establish a radio bearer and reconfigure an RRC connection.

Specifically, the mobility management network element instructs the access network to establish the radio bearer, and an RRC connection is reconfigured between the access network and the user equipment.

1311. The user equipment sends a PDN connection establishment accept message to the mobility management network element.

1312. The mobility management network element modifies a bearer.

Specifically, the mobility management network element sends a bearer modification request message to the serving gateway, where the bearer modification request message includes user-plane information that is allocated by the access network, and is used to establish a downlink user-plane tunnel of the PDN connection. The user-plane information allocated by the access network includes information such as an IP address and a tunnel endpoint identifier that are of the access network.

An entire PDN connection is reestablished by using the foregoing process, where a data gateway reselected by a mobility management network element may forward a received and resent downlink data packet, so that the downlink data packet can arrive at user equipment in a timely manner, which can reduce or avoid impact on a user, and improve user experience.

It should be noted that, in the embodiment shown in FIG. 13, only contexts of some PDN connections are established on a reset data gateway, and a recovery process, in the foregoing embodiment, of a PDN connection on a data gateway that is not reset is applied to a scenario in which a mobility management network element is an MME or an SGSN. In the foregoing embodiment, if the mobility management network element is an SGSN, for a PDN connection established on a reset data gateway, steps of a PDN connection deactivation procedure initiated by the SGSN are corresponding to step 1204 to step 1210. To avoid repetition, details are not described herein again.

If contexts of all PDN connections of user equipment are established on a reset data gateway, and when the mobility management network element is an MME, the mobility management network element initiates a detach procedure, and steps of the detach procedure are corresponding to step 1104 to step 1110. To avoid repetition, details are not described herein again.

If contexts of all PDN connections of user equipment are established on a reset data gateway, and when the mobility management network element is an SGSN, the mobility management network element initiates a PDN connection deactivation procedure. Steps of the PDN connection deactivation procedure are corresponding to step 1204 to step 1210. To avoid repetition, details are not described herein again.

Figure 14:
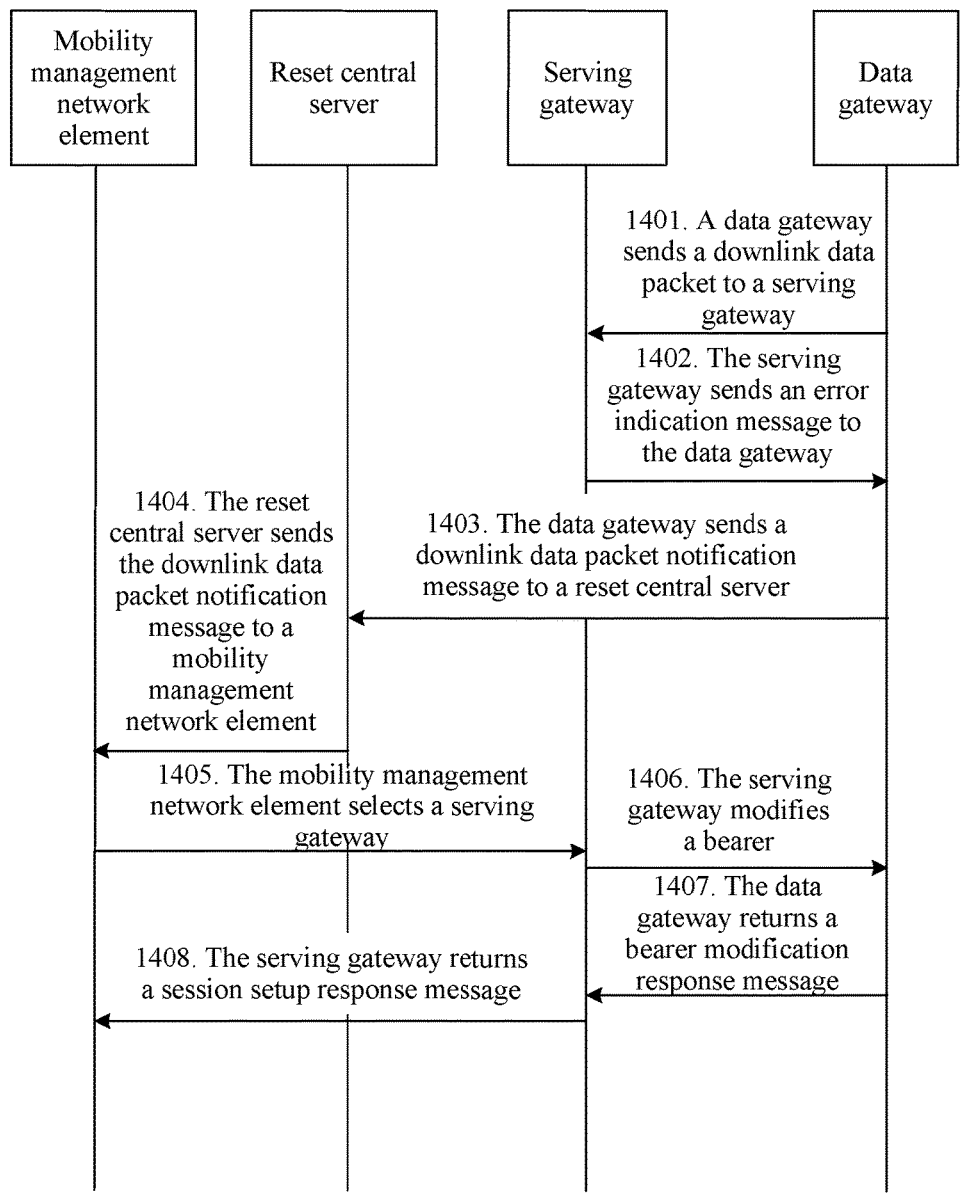
FIG. 14 is a schematic flowchart of a PDN connection reestablishing method according to another embodiment of the present disclosure.

FIG. 14 is a schematic flowchart of a PDN connection reestablishing method according to another embodiment of the present disclosure. FIG. 14 shows a scenario in which a serving gateway is reset when a data gateway and the serving gateway are separately deployed. Specifically, a method shown in FIG. 14 includes the following steps.

1401. A data gateway sends a downlink data packet to a serving gateway.

Specifically, after receiving the downlink data packet, the data gateway sends the downlink data packet to the serving gateway.

1402. The serving gateway sends an error indication message to the data gateway.

Specifically, after the serving gateway receives the downlink data packet sent by the data gateway, the serving gateway cannot find a context of user equipment corresponding to the downlink data packet due to reset. Therefore, the serving gateway sends the error indication (Error Indication) message to the data gateway. Then the data gateway learns that an exception occurs in the serving gateway.

Alternatively, the data gateway can learn, by using a reset counter in a signaling message between the data gateway and the serving gateway or a path detection mechanism between the data gateway and the serving gateway, that the serving gateway is reset.

1403. The data gateway sends a downlink data packet notification message to a reset central server.

Specifically, the data gateway obtains, by querying a context of a PDN connection of the user equipment corresponding to the downlink data packet, an identifier, stored in the context of the PDN connection, of the user equipment corresponding to the downlink data packet. The data gateway sends the downlink data packet notification message to the reset central server, where the message includes the identifier of the user equipment, and may further include a reset indication. The reset indication represents that the serving gateway is reset, or represents recovery triggered by an Error Indication.

1404. The reset central server sends the downlink data packet notification message to a mobility management network element.

Specifically, after receiving the downlink data packet notification message of the data gateway, the reset central server searches for a stored record according to the identifier of the user equipment in the message, to find information such as an identifier of the corresponding mobility management network element. The reset central server sends the downlink data packet notification message to a node corresponding to the identifier of the mobility management network element, where the message includes the identifier of the user equipment, and may further include the reset indication.

After receiving the downlink data packet notification message, the mobility management network element learns that the serving gateway is reset, where the mobility management network element learns, according to the reset indication included in the message or according to a case in which the message does not carry information about an APN, that the serving gateway is reset. The mobility management network element learns, according to the identifier of the user equipment in the message, the context of the user equipment corresponding to the downlink data packet. The mobility management network element initiates a serving gateway handover procedure, to recover an affected PDN connection. Further, the mobility management network element determines, according to a policy, whether to initiate a PDN connection recovery procedure. For example, if an IMS APN exists in the context of the user equipment, the user is a VIP user. The policy may be preconfigured on the mobility management network element, or may be obtained from another network element such as an O&M center or a PCRF. The mobility management network element determines, according to information such as an ARP, a QCI, or an APN in the context of the user equipment, a PDN connection that needs to be recovered.

1405. The mobility management network element selects a serving gateway.

Specifically, the mobility management network element reselects a serving gateway, where the serving gateway may be a reset and restarted serving gateway or another serving gateway; and sends a session setup request message to the serving gateway, where the message includes information about a PDN connection, of the user equipment, that needs to be recovered.

1406. The serving gateway modifies a bearer.

Specifically, the serving gateway sends a bearer modification request message to a data gateway corresponding to the PDN connection, where the message includes signaling-plane information and user-plane information that are of the serving gateway.

1407. The data gateway returns a bearer modification response message.

Specifically, the data gateway returns the bearer modification response message, and a PDN connection of the user equipment is reestablished between the serving gateway and the data gateway.

1408. The serving gateway returns a session setup response message.

Specifically, the serving gateway returns the session setup response message to the mobility management network element, and the context of the user equipment is reestablished on a newly selected serving gateway.

An entire PDN connection is reestablished by using the foregoing process, where a serving gateway may forward a received downlink data packet, so that the downlink data packet can arrive at user equipment in a timely manner, which can reduce or avoid impact on a user, and improve user experience.

It should be noted that, in an actual application, the mobility management network element may reestablish a PDN connection according to a status of the user equipment.

Specifically, when a PDN connection is reestablished, if the user equipment is in a connected state, the mobility management network element first releases a signaling connection to the user equipment, changes the user equipment into an idle state, and then performs steps 1405 to 1408.

Alternatively, if the user equipment is initiating a service request, a tracking area update procedure in which the mobility management network element remains unchanged, or a routing area update procedure in which the mobility management network element remains unchanged, the mobility management network element first performs step 1405 to 1408, and then performs subsequent steps of these procedures.

Alternatively, if the user equipment is initiating a tracking area update procedure in which the mobility management network element is changed or a routing area update procedure in which the mobility management network element is changed, the mobility management network element notifies a target-side mobility management network element that a procedure of reselecting a serving gateway needs to be executed, and then actions executed by the mobility management network element in steps 1405 to 1408 are executed by the target mobility management network element.

Alternatively, if the user equipment is performing a handover procedure, the mobility management network element refuses a handover request message or a reallocation request message, changes the user equipment into an idle state, and then performs steps 1405 to 1408.

Figure 15:
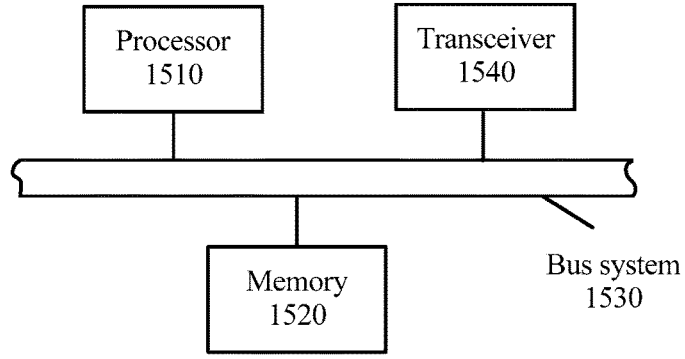
FIG. 15 is a schematic block diagram of a reset central server according to an embodiment of the present disclosure.
Figure 16:
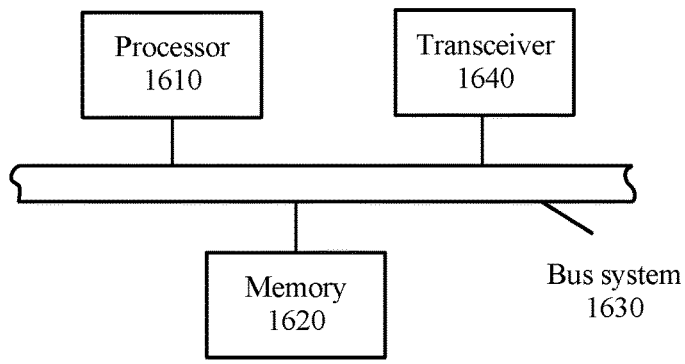
FIG. 16 is a schematic block diagram of a mobility management network element according to another embodiment of the present disclosure.
Figure 17:
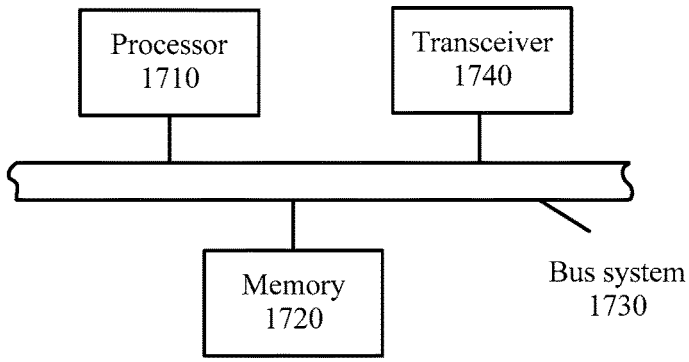
FIG. 17 is a schematic block diagram of a data gateway according to an embodiment of the present disclosure.

The foregoing describes in detail PDN connection reestablishing methods according to the embodiments of the present disclosure with reference to FIG. 4 to FIG. 14, and the following describes PDN connection reestablishing devices in the embodiments of the present disclosure with reference to FIG. 15 to FIG. 17.

FIG. 15 is a schematic block diagram of a reset central server according to another embodiment of the present disclosure. A reset central server 1500 shown in FIG. 15 includes a processor 1510, a memory 1520, a bus system 1530, and a transceiver 1540. The processor 1510, the memory 1520, and the transceiver 1540 are connected to each other by using the bus system 1530.

Specifically, the transceiver 1540 is configured to receive a first message sent by a data gateway, where the first message includes first identification information of user equipment; the processor 1510 is configured to invoke, by using the bus 1530, code stored in the memory 1520, to determine, according to the first identification information, an identifier, of a mobility management network element, corresponding to the first identification information; the transceiver 1540 is further configured to send a second message to the mobility management network element corresponding to the identifier of the mobility management network element, where the second message includes an identifier of the user equipment, so that the mobility management network element reestablishes a packet data network PDN connection of the user equipment according to the second message.

Therefore, in this embodiment of the present disclosure, a first message sent by a data gateway may be received; stored information is searched, according to first identification information of user equipment included in the first message, for an identifier of a mobility management network element and an identifier of the user equipment that are corresponding to the first identification information; and a second message is sent to the mobility management network element corresponding to the identifier of the mobility management network element, where the second message includes the identifier of the user equipment, so that the mobility management network element reestablishes a packet data network PDN connection according to the second message. Because an affected PDN connection can be reestablished in a timely manner, user experience is improved.

The methods disclosed in the foregoing embodiments of the present disclosure may be applied to the processor 1510, or implemented by the processor 1510. The processor 1510 may be an integrated circuit chip and has a signal processing capability. In an implementation process, steps in the foregoing methods may be completed by means of an integrated logic circuit of hardware in the processor 1510 or an instruction in a form of software. The processor 1510 may be a general-purpose processor, a Digital Signal Processor (DSP), an Application Specific Integrated Circuit (ASIC), a Field Programmable Gate Array (FPGA) or another programmable logic component, a discrete gate or a transistor logic component, or a discrete hardware component. The processor 1510 may implement or execute methods, steps, and logic block diagrams that are disclosed in the embodiments of the present disclosure. The general-purpose processor may be a microprocessor, or the processor may be any conventional processor. Steps of the methods disclosed with reference to the embodiments of the present disclosure may be directly executed and completed by means of a hardware decoding processor, or may be executed and completed by using a combination of hardware and software modules in a decoding processor. The software module may be located in a mature storage medium in the art, such as a random access memory (RAM), a flash memory, a read-only memory (ROM), a programmable read-only memory, an electrically-erasable programmable memory, or a register. The storage medium is located in the memory 1520, and the processor 1510 reads information in the memory 1520, and completes steps of the foregoing methods with reference to the hardware in the memory 1520. The bus system 1530 may further include a power bus, a control bus, a status signal bus, and the like in addition to including a data bus. However, for clarity of description, various buses are marked as the bus system 1530 in the figure.

Optionally, as another embodiment, the transceiver 1540 is further configured to: receive a first registration message that is sent by the data gateway and used to register information about the user equipment, where the first registration message includes an Internet Protocol IP address of the user equipment and the identifier of the user equipment; and receive a second registration message that is sent by the mobility management network element and used to register information about the user equipment, where the second registration message includes the identifier of the mobility management network element and the identifier of the user equipment. The processor 1510 associates the Internet Protocol IP address of the user equipment and the identifier of the user equipment with the identifier of the mobility management network element according to the identifier of the user equipment.

Optionally, as another embodiment, the first registration message further includes an access point name APN corresponding to the PDN connection, and the second message further includes the APN, so that the mobility management network element reestablishes the PDN connection according to the identifier of the user equipment and the APN.

Optionally, as another embodiment, when the data gateway is reset or the data gateway and a serving gateway are simultaneously reset, the first identification information includes the IP address of the user equipment, and the processor 1510 determines, according to the IP address of the user equipment, the identifier of the mobility management network element and the identifier of the user equipment that are corresponding to the IP address of the user equipment.

Optionally, as another embodiment, the identifier of the mobility management network element includes at least one of an IP address of the mobility management network element, a globally unique identifier of the mobility management network element, or a fully qualified domain name FQDN of the mobility management network element; and the identifier of the user equipment includes at least one of an international mobile subscriber identity IMSI of the user equipment, a mobile station international ISDN number MSISDN, or an international mobile equipment identity IMEI.

FIG. 16 is a schematic block diagram of a mobility management network element according to another embodiment of the present disclosure. A reset central server 1600 shown in FIG. 16 includes a processor 1610, a memory 1620, a bus system 1630, and a transceiver 1640. The processor 1610, the memory 1620, and the transceiver 1640 are connected to each other by using the bus system 1630.

Specifically, the transceiver 1640 is configured to receive a second message sent by a reset central server, where the second message includes an identifier of user equipment, the second message is used to trigger the mobility management network element to reestablish a PDN connection of the user equipment, and the second message is sent after the reset central server receives a first message sent by a data gateway, where the first message includes first identification information of the user equipment. The processor 1510 is configured to invoke, by using the bus 1530, code stored in the memory 1520 to reestablish the PDN connection of the user equipment according to the second message.

Therefore, in this embodiment of the present disclosure, a second message sent by a reset central server may be received, where the second message includes an identifier of user equipment, and the second message is used to trigger a mobility management network element to reestablish a PDN connection; and the mobility management network element reestablishes the PDN connection of the user equipment according to the second message. Because an affected PDN connection can be reestablished in a timely manner, user experience is improved.

The methods disclosed in the foregoing embodiments of the present disclosure may be applied to the processor 1610, or implemented by the processor 1610. The processor 1610 may be an integrated circuit chip and has a signal processing capability. In an implementation process, steps in the foregoing methods may be completed by means of an integrated logic circuit of hardware in the processor 1610 or an instruction in a form of software. The processor 1610 may be a general-purpose processor, a Digital Signal Processor (DSP), an Application Specific Integrated Circuit (ASIC), a Field Programmable Gate Array (FPGA) or another programmable logic component, a discrete gate or a transistor logic component, or a discrete hardware component. The processor 1610 may implement or execute methods, steps, and logic block diagrams that are disclosed in the embodiments of the present disclosure. The general-purpose processor may be a microprocessor, or the processor may be any conventional processor. Steps of the methods disclosed with reference to the embodiments of the present disclosure may be directly executed and completed by means of a hardware decoding processor, or may be executed and completed by using a combination of hardware and software modules in a decoding processor. The software module may be located in a mature storage medium in the art, such as a random access memory (RAM), a flash memory, a read-only memory (ROM), a programmable read-only memory, an electrically-erasable programmable memory, or a register. The storage medium is located in the memory 1620, and the processor 1610 reads information in the memory 1620, and completes steps of the foregoing methods with reference to the hardware in the memory 1620. The bus system 1630 may further include a power bus, a control bus, a status signal bus, and the like in addition to including a data bus. However, for clarity of description, various buses are marked as the bus system 1630 in the figure.

Optionally, as another embodiment, the first identification information includes an Internet Protocol IP address of the user equipment or the identifier of the user equipment, and the transceiver 1640 is further configured to send, to the reset central server, a second registration message used to register information about the user equipment, where the second registration message includes an identifier of the mobility management network element and the identifier of the user equipment.

Optionally, as another embodiment, the transceiver 1640 sends, to the reset central server according to a first selection policy, the second registration message used to register the information about the user equipment, where the first selection policy includes registering information about user equipment that establishes a PDN connection of an IP multimedia subsystem IMS access point name APN, or registering information about high-level user equipment VIP.

Optionally, as another embodiment, the processor 1610 determines, according to a second selection policy, a PDN connection that needs to be reestablished, where the second selection policy includes recovering the PDN connection of the IMS APN, or recovering a PDN connection of a VIP user.

Optionally, as another embodiment, the second registration message further includes an access point name APN corresponding to the PDN connection of the user equipment, and a correspondence includes a correspondence among the Internet Protocol IP address of the user equipment and/or the identifier of the user equipment, the APN, and the identifier of the mobility management network element; and the second message further includes the APN.

The processor 1610 reestablishes the PDN connection according to the identifier of the user equipment and the APN.

Optionally, as another embodiment, the second message further includes a reset indication, and the reset indication is used to represent that a serving gateway is reset.

The processor 1610 reselects a serving gateway, and sends a session setup request message to the reselected serving gateway by using the transceiver 1640, where the session setup message includes information about a PDN connection, of the user equipment, that needs to be recovered, so that the PDN connection is reestablished on the reselected serving gateway.

Optionally, as another embodiment, the data gateway and the serving gateway are jointly deployed, and some PDN connections of all PDN connections of the user equipment are established on a reset data gateway. If the data gateway is reset, the processor 1610 reselects a serving gateway, and sends a session setup request message to the reselected serving gateway by using the transceiver 1640, where the session setup request message carries information about a PDN connection established by the user equipment on another data gateway that is not reset, so that the reselected serving gateway establishes a PDN connection to the another data gateway that is not reset, where the reselected serving gateway is a reset and restarted serving gateway or another serving gateway.

Optionally, as another embodiment, the data gateway and the serving gateway are jointly deployed, and some PDN connections of all PDN connections of the user equipment are established on a reset data gateway. If the data gateway is reset, the transceiver 1640 sends a deactivation request message to the user equipment, and deletes the PDN connections on the reset data gateway, so that the user equipment reestablishes the PDN connections.

Optionally, as another embodiment, the mobility management network element is an MME, the data gateway and the serving gateway are jointly deployed, or the data gateway and the serving gateway are separately deployed, and all PDN connections of the user equipment are established on a reset data gateway. If the data gateway is reset, the transceiver 1640 sends a detach request message to the user equipment, where the detach request message carries a cause value of a re-attach request, so that the user equipment deletes all PDN connections according to the detach request message and reinitiates a PDN establishment request.

Optionally, as another embodiment, the mobility management network element is an SGSN, the data gateway and the serving gateway are jointly deployed, or the data gateway and the serving gateway are separately deployed, and all PDN connections of the user equipment are established on a reset data gateway. If the data gateway is reset, the transceiver 1640 sends a PDP deactivation message to the user equipment, where the PDP deactivation message carries a cause value of a reactivation request, so that the user equipment deletes all PDP connections according to the PDP deactivation message and reinitiates an activate PDP request.

Optionally, as another embodiment, the data gateway and the serving gateway are separately deployed, and some PDN connections of all PDN connections of the user equipment are established on a reset data gateway. If the data gateway is reset, the transceiver 1640 sends a deactivation request message to the user equipment, and deletes the PDN connections on the reset data gateway, so that the user equipment reestablishes the PDN connections.

Optionally, as another embodiment, the processor 1610 is further configured to determine, according to identification information of a data gateway and identification information of a serving gateway, whether the data gateway and the serving gateway are jointly deployed, where the identification information of the data gateway and the identification information of the serving gateway include an IP address of the data gateway and an IP address of the serving gateway, and/or a fully qualified domain name of the data gateway and a fully qualified domain name of the serving gateway.

Optionally, as another embodiment, the identifier of the user equipment includes at least one of an international mobile subscriber identity IMSI of the user equipment, a mobile station international ISDN number MSISDN, or an international mobile equipment identity IMEI.

The identifier of the mobility management network element includes at least one of an IP address of the mobility management network element, a globally unique identifier of the mobility management network element, or a fully qualified domain name FQDN of the mobility management network element.

FIG. 17 is a schematic block diagram of a data gateway according to another embodiment of the present disclosure. A reset central server 1700 shown in FIG. 17 includes a processor 1710, a memory 1720, a bus system 1730, and a transceiver 1740. The processor 1710, the memory 1720, and the transceiver 1740 are connected to each other by using the bus system 1730.

Specifically, the transceiver 1740 is configured to receive a downlink data packet; and the processor 1710 is configured to invoke, by using the bus 1730, code stored in the memory 1720 to process data received by the transceiver 1740. The transceiver 1740 is further configured to send a first message to a reset central server, where the first message includes first identification information of user equipment, so that the reset central server reestablishes a PDN connection of the user equipment according to the first message.

Therefore, in this embodiment of the present disclosure, a first message may be determined according to header information of a downlink data packet, where the first message includes first identification information of user equipment; then a data gateway sends the first message to a reset central server, so that the reset central server recovers a PDN connection. Because an affected PDN connection can be reestablished in a timely manner, user experience is improved.

The methods disclosed in the foregoing embodiments of the present disclosure may be applied to the processor 1710, or implemented by the processor 1710. The processor 1710 may be an integrated circuit chip and has a signal processing capability. In an implementation process, steps in the foregoing methods may be completed by means of an integrated logic circuit of hardware in the processor 1710 or an instruction in a form of software. The processor 1710 may be a general-purpose processor, a Digital Signal Processor (DSP), an Application Specific Integrated Circuit (ASIC), a Field Programmable Gate Array (FPGA) or another programmable logic component, a discrete gate or a transistor logic component, or a discrete hardware component. The processor 1710 may implement or execute methods, steps, and logic block diagrams that are disclosed in the embodiments of the present disclosure. The general-purpose processor may be a microprocessor, or the processor may be any conventional processor. Steps of the methods disclosed with reference to the embodiments of the present disclosure may be directly executed and completed by means of a hardware decoding processor, or may be executed and completed by using a combination of hardware and software modules in a decoding processor. The software module may be located in a mature storage medium in the art, such as a random access memory (RAM), a flash memory, a read-only memory (ROM), a programmable read-only memory, an electrically-erasable programmable memory, or a register. The storage medium is located in the memory 1720, and the processor 1710 reads information in the memory 1720, and completes steps of the foregoing methods with reference to the hardware in the memory 1720. The bus system 1730 may further include a power bus, a control bus, a status signal bus, and the like in addition to including a data bus. However, for clarity of description, various buses are marked as the bus system 1730 in the figure.

Optionally, as another embodiment, the transceiver 1740 is further configured to send, to the reset central server, a first registration message used to register information about the user equipment, where the first registration message includes an IP address of the user equipment and an identifier of the user equipment.

Optionally, as another embodiment, the transceiver 1740 sends, to the reset central server according to a selection policy, the first registration message used to register the information about the user equipment, where the selection policy includes registering information about a PDN connection, of an IMS APN, of user equipment, or registering information about a PDN connection of VIP.

Optionally, as another embodiment, the first registration message further includes an access point name APN corresponding to the PDN connection, and the first message further includes the APN.

Optionally, as another embodiment, the processor 1710 is further configured to determine that the data gateway is reset, determine that the downlink data packet is from a trusted APN, and determine the IP address of the user equipment in a header of the downlink data packet, where the first identification information includes the IP address of the user equipment.

Optionally, as another embodiment, the processor 1710 is further configured to determine that a serving gateway is reset; determine, by querying a context of the PDN connection of the user equipment corresponding to the downlink data packet, the identifier of the user equipment corresponding to the downlink data packet; and determine the first message according to the identifier of the user equipment, where the first identification information includes the identifier of the user equipment.

Optionally, as another embodiment, the first message further includes a reset indication, and the reset indication represents that the serving gateway is reset, or represents an error indication message sent by the serving gateway to the data gateway, where the error indication message represents that the serving gateway is reset.

Optionally, as another embodiment, the identifier of the user equipment includes at least one of an international mobile subscriber identity IMSI of the user equipment, a mobile station international ISDN number MSISDN, or an international mobile equipment identity IMEI.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely as an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A reset central server, comprising: at least one processor and a non-transitory computer readable medium having a plurality of computer readable instructions stored thereon that, when executed by the at least one processor, cause the at least one processor to:
receive a first message sent by a data gateway, wherein the first message comprises first identification information, wherein the first message is sent by the data gateway in response to that the data gateway determines:
that the data gateway is reset;
a downlink data packet received from a trusted an access point name (APN); and
an Internet Protocol (IP) address of a user equipment in a header of the downlink data packet; wherein the first identification information includes the IP address of the user equipment; or
that a serving gateway is reset using a reset counter in a signaling message;
a downlink data packet received; and
an identifier of the user equipment corresponding to the downlink data packet by querying a context of a packet data network (PDN) connection of the user equipment corresponding to the downlink data packet, wherein the first identification information includes the identifier of the user equipment;

determine, according to the first identification information, an identifier, of a mobility management network element, corresponding to the first identification information; and send a second message to the mobility management network element corresponding to the identifier of the mobility management network element, wherein the second message comprises an identifier of user equipment, wherein the mobility management network element is operable to reestablish the PDN connection of the user equipment according to the second message.

2. The reset central server according to claim 1, wherein the first identification information comprises the IP address of the user equipment or the identifier of the user equipment, and the instructions further cause the at least one processor to:

receive a first registration message that is sent by the data gateway and used to register information about the user equipment, wherein the first registration message comprises the IP address of the user equipment and the identifier of the user equipment;

receive a second registration message that is sent by the mobility management network element and used to register information about the user equipment, wherein the second registration message comprises the identifier of the mobility management network element and the identifier of the user equipment; and associate the IP address of the user equipment and the identifier of the user equipment with the identifier of the mobility management network element according to the identifier of the user equipment.

3. The reset central server according to claim 2, wherein the first registration message further comprises an access point name (APN) corresponding to the PDN connection; and the second message further comprises the APN, wherein the mobility management network element is operable to reestablish the PDN connection according to the identifier of the user equipment and the APN.

4. The reset central server according to claim 2, wherein:

when the data gateway is reset, the first identification information comprises the IP address of the user equipment; and the instructions cause the processor to determine, according to the IP address of the user equipment, the identifier of the mobility management network element and the identifier of the user equipment that are corresponding to the IP address of the user equipment.

5. The reset central server according to claim 2, wherein when the serving gateway is reset, the first identification information comprises the identifier of the user equipment.

6. A mobility management network element, comprising: at least one processor and a non-transitory computer readable medium having a plurality of computer readable instructions stored thereon that, when executed by the at least one processor, cause the at least one processor to:

receive a second message sent by a reset central server, wherein the second message comprises an identifier of user equipment, the second message triggering the mobility management network element to reestablish a packet data network (PDN) connection, and the second message is received by the mobility management network element after the reset central server receives a first message sent by a data gateway, wherein the first message comprises first identification information of the user equipment, wherein the first message is sent by the data gateway in response to that the data gateway determines:

that the data gateway is reset;

a downlink data packet received from a trusted an access point name (APN); and an Internet Protocol (IP) address of the user equipment in a header of the downlink data packet; wherein the first identification information includes the IP address of the user equipment; or that a serving gateway is reset based on a path detection mechanism;

a downlink data packet received; and an identifier of the user equipment corresponding to the downlink data packet by querying a context of the PDN connection of the user equipment corresponding to the downlink data packet, wherein the first identification information includes the identifier of the user equipment; and reestablish the PDN connection according to the second message.

7. The mobility management network element according to claim 6, wherein the first identification information comprises the IP address of the user equipment or the identifier of the user equipment, and the instructions further cause the at least one processor to:

send, to the reset central server, a second registration message used to register information of the user equipment, wherein the second registration message comprises an identifier of the mobility management network element and the identifier of the user equipment.

8. The mobility management network element according to claim 7, wherein the instructions cause the at least one processor to send, to the reset central server according to a first selection policy, the second registration message used to register the information of the user equipment, wherein the first selection policy comprises registering information of user equipment that establishes a PDN connection of an IP multimedia subsystem (IMS) access point name (APN) or registering information of high-level user equipment.

9. The mobility management network element according to claim 8, wherein the instructions cause the at least one processor to determine, according to a second selection policy, a PDN connection that needs to be reestablished, wherein the second selection policy comprises recovering the PDN connection of the IMS APN, or recovering a PDN connection of the high-level user equipment.

10. The mobility management network element according to claim 7, wherein:

the second registration message further comprises an access point name (APN) corresponding to the PDN connection, and a correspondence comprises a correspondence among the IP address of the user equipment or the identifier of the user equipment, the APN, and the identifier of the mobility management network element;

the second message further comprises the APN; and the instructions cause the at least one processor to reestablish the PDN connection according to the identifier of the user equipment and the APN.

11. The mobility management network element according to claim 7, wherein the second message further comprises a reset indication, and the reset indication is used to represent that the serving gateway is reset; and the instructions further cause the at least one processor to:

reselect a serving gateway, and send a session setup request message to the reselected serving gateway, wherein the session setup message comprises information about a PDN connection, of the user equipment, that needs to be recovered, so that the PDN connection is reestablished on the reselected serving gateway.

12. The mobility management network element according to claim 7, wherein:
the data gateway and the serving gateway are jointly deployed, and some PDN connections of all PDN connections about the user equipment are established on a reset data gateway; and
if the data gateway is reset, the instructions further cause the at least one processor to: reselect a serving gateway, and send a session setup request message to the reselected serving gateway, wherein the session setup request message carries information about a PDN connection established by the user equipment on another data gateway that is not reset, so that the reselected serving gateway establishes a PDN connection to the another data gateway that is not reset, wherein the reselected serving gateway is a reset and restarted serving gateway or another serving gateway.

13. The mobility management network element according to claim 7, wherein:
the data gateway and the serving gateway are jointly deployed, and some PDN connections of all PDN connections of the user equipment are established on a reset data gateway; and
if the data gateway is reset, the instructions further cause the at least one processor to: send a deactivation request message to the user equipment, and delete the PDN connections on the reset data gateway, so that the user equipment reestablishes the PDN connections.

14. The mobility management network element according to claim 7, wherein the mobility management network element is an MME, the data gateway and the serving gateway are jointly deployed, or the data gateway and the serving gateway are separately deployed, and all PDN connections of the user equipment are established on a reset data gateway; and
if the data gateway is reset, the instructions further cause the at least one processor to: send a detach request message to the user equipment, wherein the detach request message carries a cause value of a re-attach request, so that the user equipment deletes all PDN connections according to the detach request message and reinitiates an attach procedure.

15. The mobility management network element according to claim 7, wherein the mobility management network element is an SGSN, the data gateway and the serving gateway are jointly deployed, or the data gateway and the serving gateway are separately deployed, and all PDN connections about the user equipment are established on a reset data gateway; and
if the data gateway is reset, the instructions further cause the at least one processor to: send a PDP deactivation message to the user equipment, wherein the PDP deactivation message carries a cause value of a reactivation request, so that the user equipment deletes all PDP connections according to the PDP deactivation message and reinitiates an activate PDP request.

16. A packet data network (PDN) connection reestablishing method, comprising:
receiving, by a reset central server, a first message sent by a data gateway, wherein the first message comprises first identification information, wherein the first message is sent by the data gateway in response to that the data gateway determines:
that the data gateway is reset;
a downlink data packet received from a trusted an access point name (APN); and
an Internet Protocol (IP) address of a user equipment in a header of the downlink data packet; wherein the first identification information includes the IP address of the user equipment; or
that a serving gateway is reset based on an indication sent by the serving gateway to the data gateway indicating that the serving gateway is reset;
a downlink data packet received; and
an identifier of the user equipment corresponding to the downlink data packet by querying a context of a packet data network (PDN) connection of the user equipment corresponding to the downlink data packet, wherein the first identification information includes the identifier of the user equipment;
determining, by the reset central server according to the first identification information, an identifier, of a mobility management network element, corresponding to the first identification information; and
sending, by the reset central server, a second message to the mobility management network element corresponding to the identifier of the mobility management network element, wherein the second message comprises an identifier of user equipment, wherein the mobility management network element is operable to reestablish the PDN connection according to the second message.

17. The method according to claim 16, wherein the first identification information comprises the IP address of the user equipment or the identifier of the user equipment, and the method further comprises:
receiving, by the reset central server, a first registration message that is sent by the data gateway and used to register information about the user equipment, wherein the first registration message comprises the IP address of the user equipment and the identifier of the user equipment;
receiving, by the reset central server, a second registration message that is sent by the mobility management network element and used to register information about the user equipment, wherein the second registration message comprises the identifier of the mobility management network element and the identifier of the user equipment; and
associating, by the reset central server, the IP address of the user equipment and the identifier of the user equipment with the identifier of the mobility management network element according to the identifier of the user equipment.

18. The method according to claim 17, wherein the first registration message further comprises an access point name (APN) corresponding to the PDN connection; and
the second message further comprises the APN, wherein the mobility management network element is operable to reestablish the PDN connection according to the identifier of the user equipment and the APN.

19. The method according to claim 17, wherein:
when the data gateway is reset, the first identification information comprises the IP address of the user equipment; and
the determining, by the reset central server according to the first identification information, an identifier, of a mobility management network element, corresponding to the first identification information comprises:
determining, by the reset central server according to the IP address of the user equipment, the identifier of the mobility management network element and the identifier of the user equipment that are corresponding to the IP address of the user equipment.

20. The method according to claim 17, wherein when the serving gateway is reset, the first identification information comprises the identifier of the user equipment.

* * * * *